United States Patent
Singh et al.

(10) Patent No.: US 12,112,856 B2
(45) Date of Patent: Oct. 8, 2024

(54) SPENT NUCLEAR FUEL STORAGE RACK SYSTEM

(71) Applicant: Holtec International, Camden, NJ (US)

(72) Inventors: Krishna P. Singh, Jupiter, FL (US); Stephen J. Agace, Middletown, DE (US)

(73) Assignee: Holtec International

( * ) Notice: Subject to any disclaimer, the term of this patent is extended or adjusted under 35 U.S.C. 154(b) by 0 days.

(21) Appl. No.: 17/973,895

(22) Filed: Oct. 26, 2022

(65) Prior Publication Data

US 2023/0129679 A1 Apr. 27, 2023

Related U.S. Application Data

(60) Provisional application No. 63/271,849, filed on Oct. 26, 2021.

(51) Int. Cl.
*G21C 19/07* (2006.01)
*G21C 19/40* (2006.01)

(52) U.S. Cl.
CPC .......... *G21C 19/07* (2013.01); *G21C 19/40* (2013.01)

(58) Field of Classification Search
CPC .......... G21C 19/07; G21C 19/40; G21F 5/012
See application file for complete search history.

(56) References Cited

U.S. PATENT DOCUMENTS

| | | | |
|---|---|---|---|
| 4,624,295 A * | 11/1986 | Howland | B27M 3/0086 |
| | | | 144/350 |
| 4,714,585 A | 12/1987 | Kast | |
| 4,900,505 A | 2/1990 | Machado et al. | |
| 8,158,962 B1 * | 4/2012 | Rosenbaum | G21F 1/08 |
| | | | 376/327 |

(Continued)

FOREIGN PATENT DOCUMENTS

| | | |
|---|---|---|
| CN | 109243645 A | 1/2019 |
| NL | 8400864 A | 10/1985 |

OTHER PUBLICATIONS

International Search Report and Written Opinion of the International Searching Authority of PCT/US2022/047858, Issued Feb. 9, 2023.

*Primary Examiner* — Jack W Keith
*Assistant Examiner* — Daniel Wasil
(74) *Attorney, Agent, or Firm* — The Belles Group, P.C.

(57) ABSTRACT

A fuel rack for storing nuclear fuel in a fuel pool in one embodiment comprises a baseplate configured for placement in a fuel pool, and a cellular body coupled to the baseplate. The body comprises tightly-packed upwardly open cells which each hold a nuclear fuel assembly. In one embodiment, each cell may have a hexagonal cross-sectional configuration. The cells are each formed by angled cell walls and corners formed between adjoining cell walls. Adjacent cells are arranged to meet in corner-to-corner alignment. This produces triangular-shaped flux traps interspersed between the cells for reactivity control. In some embodi- (Continued)

ments, at least one peripheral side of the fuel rack has an undulating configuration defining a series of alternating peaks and valleys which nests with a complementary configured peripheral side of an adjacent fuel rack. This provides higher packing density of fuel racks and fuel assemblies in the fuel pool.

22 Claims, 25 Drawing Sheets

(56) References Cited

U.S. PATENT DOCUMENTS

| | | |
|---|---|---|
| 8,576,976 B2 | 11/2013 | Singh et al. |
| 8,848,853 B2 | 9/2014 | Foussard et al. |
| 9,728,284 B2 | 8/2017 | Singh et al. |
| 10,037,826 B2 | 7/2018 | Singh et al. |
| 10,418,137 B2 | 9/2019 | Singh et al. |
| 10,854,346 B2 | 12/2020 | Singh et al. |
| 11,282,615 B2 | 3/2022 | Singh |
| 2002/0163989 A1* | 11/2002 | Dallongeville ......... G21F 5/012 376/272 |
| 2009/0175404 A1* | 7/2009 | Singh ..................... G21C 19/07 376/272 |
| 2011/0002435 A1 | 1/2011 | Lu et al. |
| 2012/0128114 A1 | 5/2012 | Iwasaki et al. |
| 2012/0250814 A1 | 10/2012 | Choi et al. |
| 2013/0129033 A1* | 5/2013 | Nakamura ................ G21F 9/36 376/272 |
| 2013/0343503 A1* | 12/2013 | Agace .................... G21C 19/07 376/272 |
| 2016/0027538 A1* | 1/2016 | Singh ..................... G21C 19/07 376/272 |
| 2016/0133346 A1* | 5/2016 | Singh ..................... G21C 19/07 376/272 |
| 2018/0247720 A1* | 8/2018 | Singh ..................... G21C 19/07 |
| 2021/0225540 A1 | 7/2021 | Singh et al. |

* cited by examiner

SPENT NUCLEAR FUEL STORAGE RACK SYSTEM

CROSS-REFERENCE TO RELATED APPLICATIONS

The present application claims the benefit of priority to U.S. Provisional Application No. 63/271,849 filed Oct. 26, 2021; the entirety of which is incorporated herein by reference.

BACKGROUND

The present invention generally relates to systems for storage of spent nuclear fuel underwater, and more particularly to an improved nuclear fuel storage rack system for use in a fuel pool in a nuclear generation plant.

A conventional free-standing, high density nuclear fuel storage rack is a cellular structure typically supported on a set of pedestals from the floor or bottom slab of the water-filled spent fuel pool. The bottom extremity of each fuel storage cell is welded to a common baseplate which serves to provide the support surface for the upwardly extending vertical storage cells and stored nuclear fuel therein. The cellular region comprises an array of narrow and elongated prismatic cavities formed by the cells which are each sized to accept a single nuclear fuel assembly comprising a plurality of new or spent nuclear fuel rods. The term "active fuel region" denotes the vertical space above the baseplate within the rack where the enriched uranium is located.

Fuel racks used to store spent nuclear fuel assemblies hold them upright in the pool of water which serves to remove the generated heat, protect them against damage under seismic conditions and control reactivity. The nuclear fuel assemblies insertable into the reactor and which hold multiple nuclear fuel rods used in most Russian-origin reactors is of hexagonal cross section. To store the hexagonal cross section fuel assemblies, it is desirable to have a rack module that has hexagonal cell openings such that the quantity of water in the storage cavity and around it is precisely controlled, which is necessary to achieve the desired sub-criticality of the stored fuel array. The fuel must also be elevated above the pool liner (floor or bottom slab) such that there is a water plenum underneath the rack which the rack's design configuration must facilitate to deliver cold water to the space around the fuel and through its inter-rod spaces by natural convective thermosiphon action flow. Additional design requirements for the fuel rack are: (a) the hexagonal cavities must provide a smooth interface for the fuel to enable unobstructed insertion and removal operations; (b) the side walls of the storage cavities must be capable of withstanding the lateral loading from the rattling of the fuel assemblies during a seismic event; and (c) in the case of free-standing modules (i.e. not fastened to spent fuel pool floor slab), the racks must have sufficient flexural rigidity to withstand the nuclear plant's Design Basis Earthquake without excessive movement.

Improvements in fuel racks for wet storage of hexagonal fuel assemblies is desired which can fulfill the foregoing requirements.

SUMMARY

The present disclosure provides a fuel rack suitable for wet storage of nuclear fuel in a spent fuel pool of a nuclear facility. In one embodiment, each rack comprises a baseplate configured for placement on the floor of fuel pool and a cellular body supported therefrom on a top surface of the baseplate. The body defines staggered array of hexagonal fuel storage cells each configured to hold a single hexagonal fuel assembly. The cells are circumscribed and defined by a plurality of obliquely angled cells walls which create the hexagonal shape in which corners are formed between pairs of adjoining walls.

Each hexagonal cell may be formed by a plurality of obliquely angled cell walls defining corners between adjacent walls. In one non-limiting embodiment, all cells of the fuel rack are aligned and meet in corner-to-corner relationship with adjacent cells. This forms a plurality of triangular shaped flux traps interspersed between the cells for fuel rack reactivity control. There is no flat-to-flat interface between the walls of the adjacent cells in one embodiment. In the disclosed arrangement, at least each interior cell (i.e. those not along the perimeter of the fuel rack) has flat cell walls which have a corresponding adjacent triangular flux trap which minimizes radiation transmission to other adjacent cells through the walls and provides criticality control.

One or more neutron absorber apparatuses such as boron-containing plates in one embodiment may be disposed inside the cells and affixed to the walls of the cells such that the plates do not interfere with loading the fuel assemblies into each cell. The inner surface of each cell wall In some embodiments, at least one peripheral edge or side of the fuel rack baseplates may have a non-linear profile comprising an undulating "sawtooth" configuration defining a series of alternating peaks and valleys. The peaks and valleys may be V-shaped in some embodiments; however, other shaped undulating patterns may be used as further described herein. The undulating baseplate receives a mating undulating baseplate of an adjacent fuel rack in the fuel pool which becomes partially nested therein. Advantageously, this provides a higher packing density of fuel racks in the pool to increase the nuclear fuel storage capacity of the facility.

According to one aspect, a fuel rack for storing spent nuclear fuel comprises: a baseplate configured for placement in a fuel pool; and a cellular body coupled to the baseplate and comprising a plurality of open cells, each cell having a hexagonal configuration to receive a fuel assembly therein, each cell being formed by a plurality of angled cell walls and corners formed between adjoining cell walls; wherein all adjacent cells meet in a corner-to-corner alignment.

According to another aspect, a nuclear fuel storage system comprises: a first baseplate configured for placement in a spent fuel pool, the first baseplate having an undulating peripheral side configured to mate with a complementary configured undulating peripheral side of a second baseplate of a second fuel rack; and a cellular body coupled to the first baseplate and comprising a plurality of open cells, each cell having a configuration for receiving a fuel assembly therein; wherein the undulating peripheral side of the second baseplate is at least partially nestable within the undulating peripheral side of the first baseplate.

According to another aspect, a method for storing nuclear fuel in a fuel pool in a tightly packed configuration comprises: positioning a first fuel rack on a floor of a fuel pool, the first fuel rack comprising a plurality of open cells each configured for receiving a fuel assembly therein and a first baseplate defining a first undulating peripheral side; positioning a second fuel rack on a floor of a fuel pool, the second fuel rack comprising a plurality of open cells each configured for receiving a fuel assembly therein and a second baseplate defining a second undulating peripheral side; nesting the second undulating peripheral side of the second baseplate at least partially within the first undulating peripheral side of the first baseplate.

BRIEF DESCRIPTION OF THE DRAWINGS

The features of the exemplary embodiments will be described with reference to the following drawings where like elements are labeled similarly, and in which.

Figure 1:
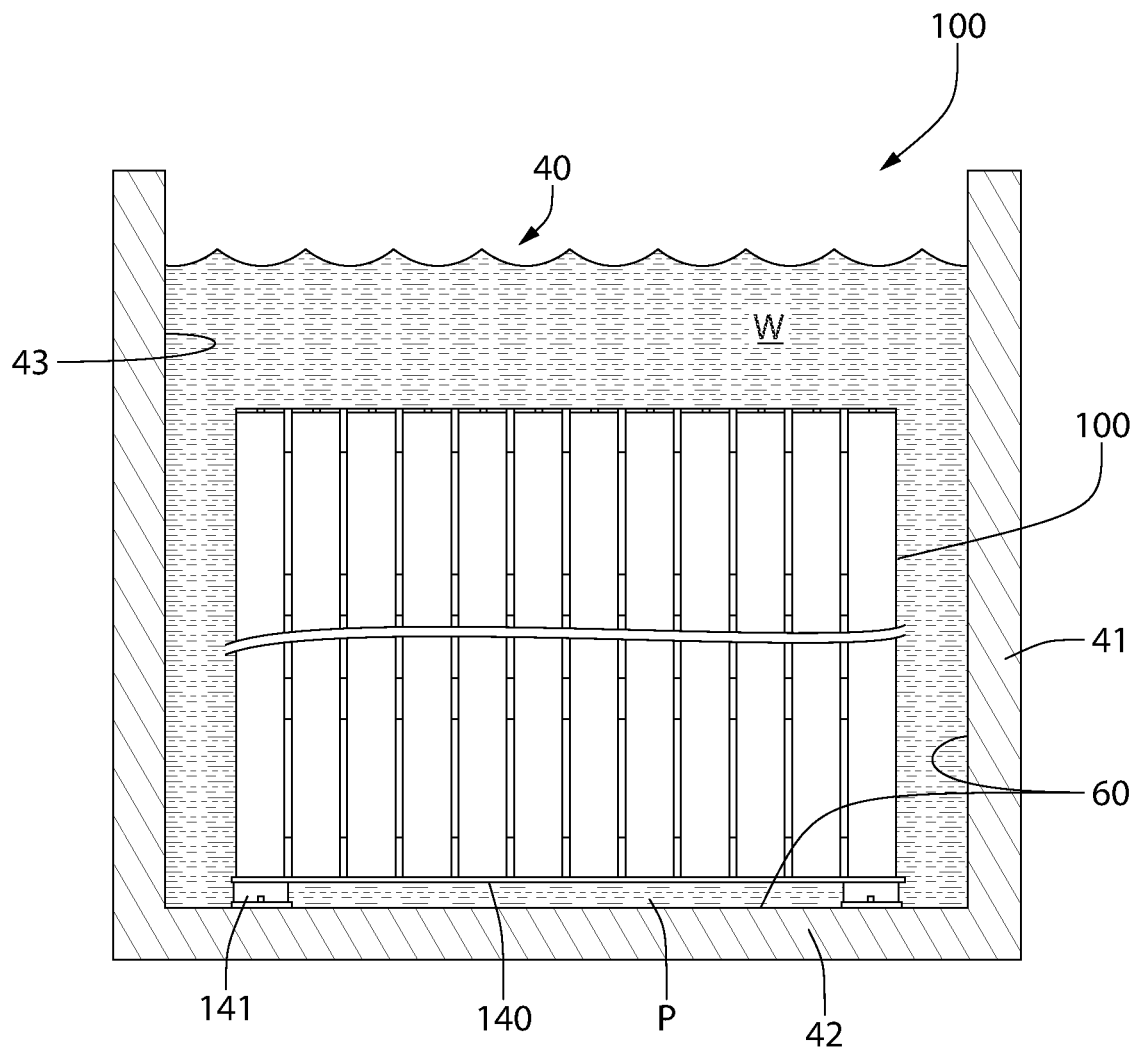
FIG. 1 is a side view of a spent nuclear fuel pool containing a nuclear fuel rack according to the present disclosure.
Figure 2:
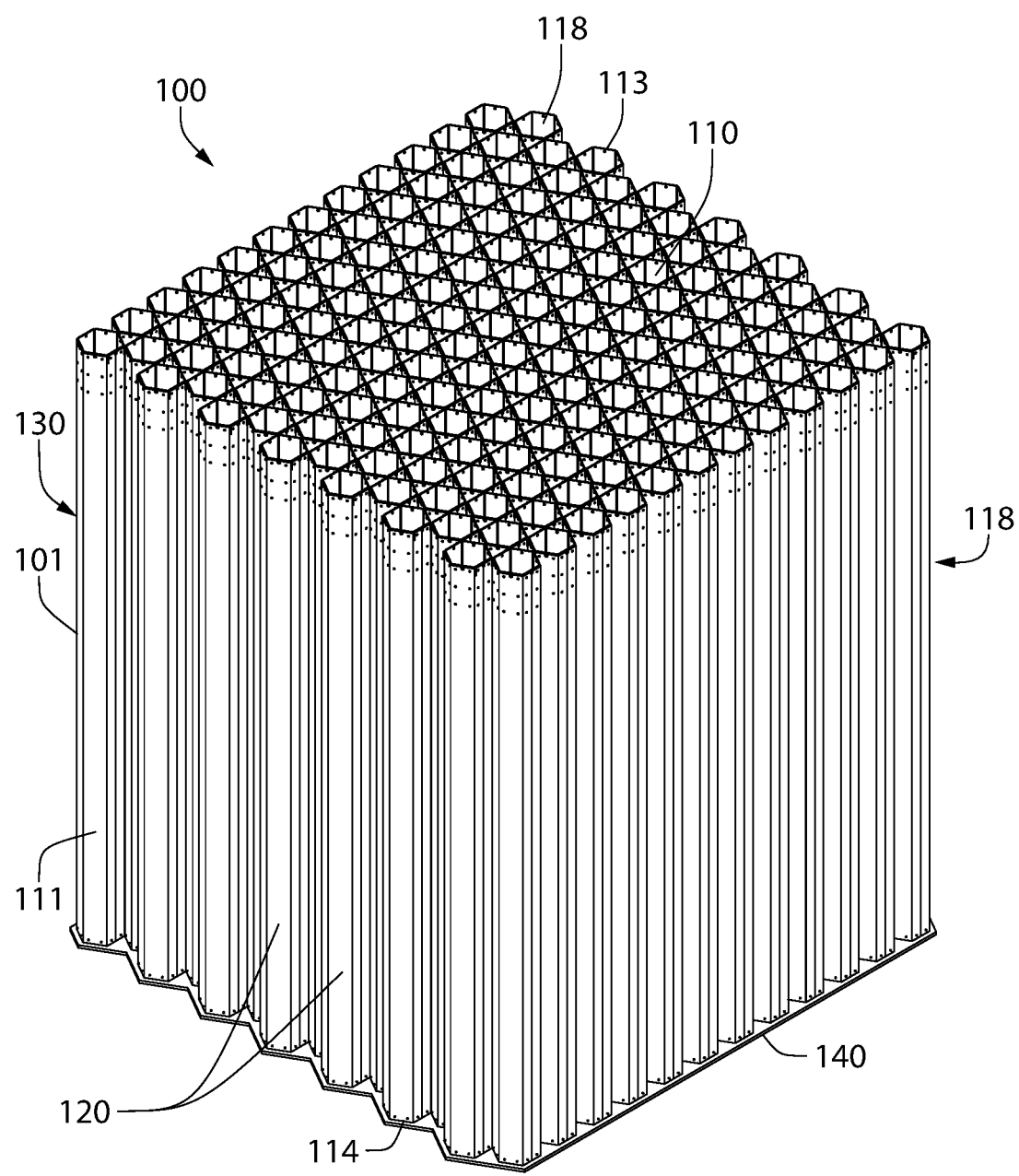
FIG. 2 is a top perspective view of the fuel rack.
Figure 3:
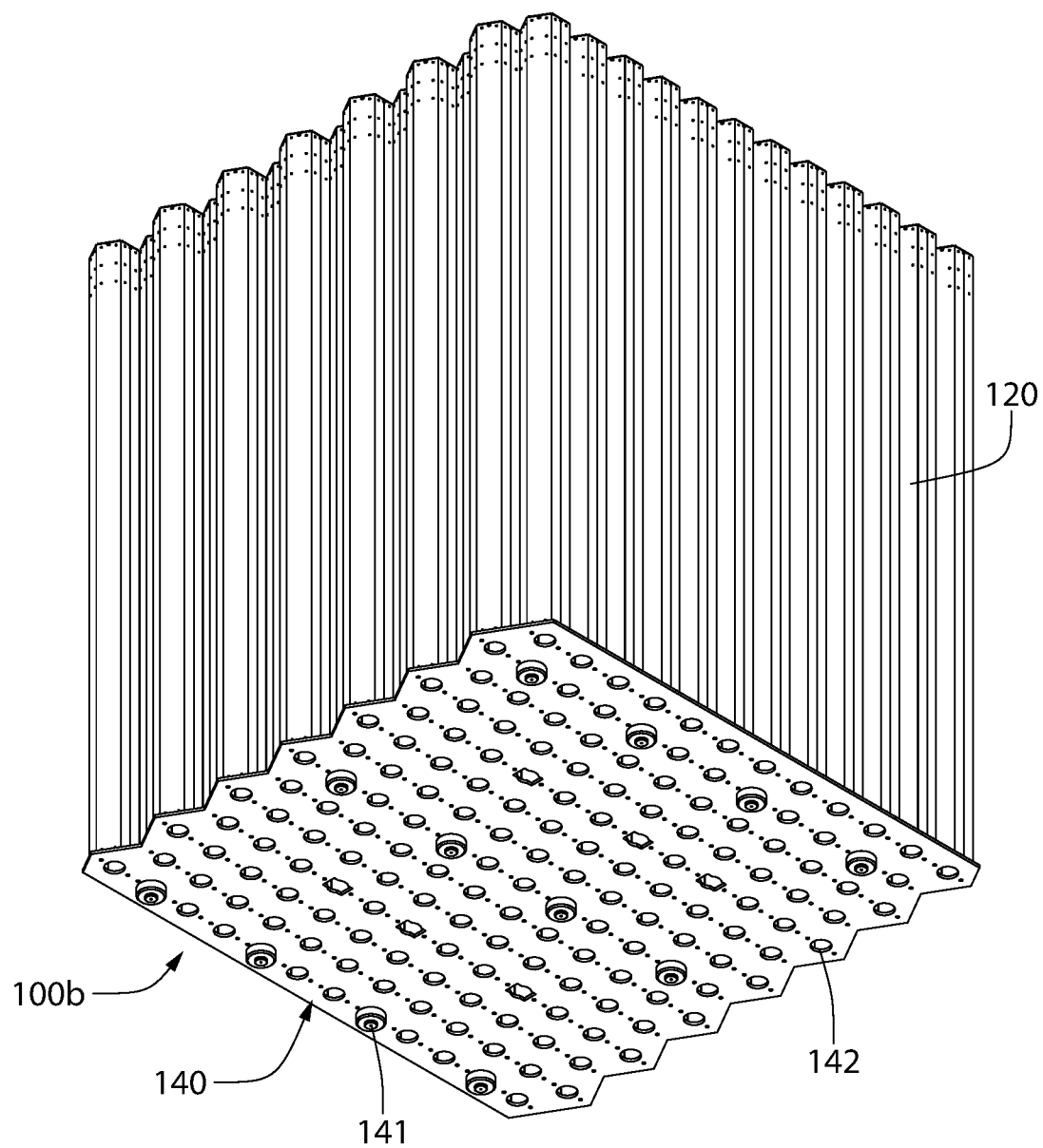
FIG. 3 is a bottom perspective view of the fuel rack.

All drawings are schematic and not necessarily to scale. Parts shown and/or given a reference numerical designation in one figure may be considered to be the same parts where they appear in other figures without a numerical designation for brevity unless specifically labeled with a different part number and described herein.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features. Furthermore, all features and designs disclosed herein may be used in combination even if not explicitly described as such.

In the description of embodiments disclosed herein, any reference to direction or orientation is merely intended for convenience of description and is not intended in any way to limit the scope of the present invention. Relative terms such as "lower," "upper," "horizontal," "vertical,", "above." "below." "up," "down," "top" and "bottom" as well as derivative thereof (e.g., "horizontally," "downwardly," "upwardly." etc.) should be construed to refer to the orientation as then described or as shown in the drawing under discussion. These relative terms are for convenience of description only and do not require that the apparatus be constructed or operated in a particular orientation. Terms such as "attached," "affixed." "connected," "coupled," "interconnected," and similar refer to a relationship wherein structures are secured or attached to one another either directly or indirectly through intervening structures, as well as both movable or rigid attachments or relationships, unless expressly described otherwise. It will be appreciated that any numerical ranges that may be described herein shall be understood to include the lower and upper numerical terminus values or limits of the cited range, and any numerical values included in the cited range may serve as the terminus values.

Referring initially to FIG. 1, a nuclear facility which may be a nuclear generating plant includes a water-impounded spent fuel pool 40 according to the present disclosure configured for wet storage of nuclear fuel such as in individual nuclear fuel racks 100. The fuel pool 40 comprise a plurality of vertical sidewalls 41 rising upwards from an adjoining substantially horizontal bottom floor wall or slab 42 (recognizing that some slope may intentionally be provided in the upper surface of the floor slab for drainage toward a low point if the pool is to be emptied and rinsed/decontaminated at some time and due to installation tolerances). The floor slab 42 and sidewalls 41 may be formed of reinforced concrete in one non-limiting embodiment. The fuel pool floor slab 42 may be formed in and rest on soil or engineered fill. The floor slab 42 may be located at grade, below grade, or elevated above grade. In some embodiments contemplated, the floor slab 42 and sidewalls 41 may be at least partially in which soil and/or engineered fill surrounds the outer surfaces of the sidewalls. Any of the foregoing arrangements or others may be used depending on the layout of the nuclear facility and does not limit of the invention.

In one embodiment, the fuel pool 40 may have a rectilinear shape in top plan view. Four sidewalls 41 may be provided in which the pool has an elongated rectangular shape (in top plan view) with two longer opposing sidewalls and two shorter opposing sidewalls (e.g. end walls). Other configurations of the fuel pool 40 are possible such as square shapes, other polygonal shapes, and non-polygonal shapes.

The sidewalls 41 and floor slab 42 of the fuel pool 40 define an upwardly open well or cavity 43 configured to hold cooling pool water W and the plurality of submerged nuclear fuel racks 100 each holding multiple nuclear fuel bundles or assemblies 30 of hexagonal configuration (see, e.g., FIGS. 25-28). Each fuel assembly 30 in turn contains multiple individual spent uranium fuel rods. The fuel assemblies may each have a hexagonal configuration in one embodiment a shown which is common for Russian origin or other similar style reactors. The fuel racks 100 storing the fuel assemblies are emplaced on the floor slab 42 in a high-density arrangement in the horizontally-abutting manner as further described herein.

In some embodiments, a fuel pool liner system may be provided to minimize the risk of pool water leakage to the environment. The liner system may include cooling water leakage collection and detection/monitoring to indicate a leakage condition caused by a breach in the integrity of the liner system. Liner systems are further described in commonly owned U.S. patent application Ser. No. 14/877,217 filed Oct. 7, 2015, which is incorporated herein by reference in its entirety.

The liner system in one embodiment may comprise one or more liners 60 attached to the inner surfaces of the fuel pool sidewalls 41 and the floor slab 42. The inside surface of liner is contacted and wetted by the fuel pool water W. The liner 60 may be made of any suitable metal of suitable thickness which is preferably resistant to corrosion, including for example without limitation stainless steel, or other. Typical liner thicknesses may range from about and including 3/16 inch to 5/16 inch thick. Typical stainless steel liner plates include ASTM 240-304 or 304L.

In some embodiments, the liner 60 may be comprised of multiple substantially flat metal plates or sections which are hermetically seal welded together via seal welds along their contiguous peripheral edges to form a continuous liner system completely encapsulating the sidewalls 41 and floor slab 42 of the fuel pool 40 and impervious to the egress of pool water W. The liner 60 extends around and along the vertical sidewalls 41 of the fuel pool 40 and completely across the horizontal floor slab 42 to completely cover the wetted surface area of the pool. This forms horizontal sections and vertical sections of the liner to provide an impervious barrier to out-leakage of pool water W from fuel pool 40. The horizontal sections of liners 60b on the floor slab 42 may be joined to the vertical sections along perimeter corner seams therebetween by hermetic seal welding. The liner 60 may be fixedly secured to the floor slab 42 and sidewalls 41 of the fuel pool 40 by any suitable method such as threaded or other fasteners.

FIGS. 2-24 show a fuel rack 100 according to the present disclosure and various features/details thereof. Fuel rack 100 is a cellular upright module or unit comprising a vertically-extending cellular body 101 and a baseplate 140 which supports the body. Fuel rack 100 comprises a top 100a, opposite bottom 100b, and plurality of lateral sides 130 extending vertically therebetween. Baseplate 140 is configured to support the fuel rack from the floor slab 42 of fuel pool 40, as further described herein.

Fuel rack 100 may be a high density, tightly packed flux type rack as illustrated which in one embodiment as illustrated is designed to be used with nuclear spent fuel assemblies that may require the presence of water-filled radiation flux traps (when immersed in fuel pool 40) interspersed between the fuel storage cells 110 to provide radiation amelioration and reactivity control to the nuclear fuel rack. The present flux traps 300 are further described herein.

Each fuel rack 100 defines a vertical centerline axis CL which passes through the geometric center of the rack. The cellular body 101 of fuel rack 100 defines a fuel storage region R of the rack, which comprises a grid array of closely packed and vertically elongated open cells 110 each defined and circumscribed by a plurality of angled cell walls 111. Adjacent pairs of cells walls of each cell 110/tube 120 meet at an obliquely angled corner 112. Each fuel storage cell 110 therefore includes a plurality of corners 112. Cells 110 in one non-limiting embodiment may have a hexagonal configuration and transverse cross section as shown.

In one embodiment, the cells 110 may each be formed by a plurality of tightly packed and closely spaced elongated storage tubes 120 arranged in parallel axial relationship to each other along vertical centerline axis CL. The fuel rack 100 comprises peripherally arranged outboard tubes 120A which define a perimeter of the fuel rack and inboard tubes 120B located between the outboard tubes in the central portion. The outward facing cell walls 111 of the perimetrically arranged outboard tubes 120A collectively define the four lateral sides 130 of each fuel rack 100.

Tubes 120 are coupled at their bottom ends 114 to a planar top surface of a baseplate 140 and extend upwards in a substantially vertical orientation therefrom. In the illustrated embodiment, the vertical or central axis of each tube 120 is parallel to fuel rack centerline axis CL and perpendicular to the top surface of the baseplate 140. In one embodiment, tubes 120 may be rigidly affixed to baseplate 140 by welding such as via seal welds and/or other mechanical coupling means.

Tubes 120 each include an open top end 113 for insertion of fuel assemblies 30, open bottom end 114 which terminates at baseplate 140, and a plurality of elongated vertical cell walls 111 extending between the ends and defining a tube and cell height H1. Each tube 120 defines an internal cell cavity 118 that forms the cell extending vertically between the top and bottom ends 113, 114. Each cell wall 111 of the tubes defines an outer face 117 and opposing inner surface 119. Inner surfaces collectively define the vertically-extending cell cavity 118.

In the embodiment shown, each tube 120 has a hexagonal configuration defined by six angled cells walls 111 each arranged at oblique angles to adjacent walls on each side. This provides the corresponding hexagonal cross-sectional shape of the cells 110. A fuel assembly 30 can be slid down into the internal cavity 118 (i.e. cell 110) of each tube through the open top ends 114 of the tube. Each cell 110 and its associated cavity 118 are configured in cross-sectional dimension for holding only a single nuclear fuel assembly 30.

Fuel storage tubes 120 may be made of any suitable preferably corrosion resistant metal, such as without limitation stainless steel or others. The tubes may be fabricated by any suitable method, including for example without limitation a one-piece monolithic hexagonal extrusion, or a one-piece monolithic plate which is bent along multiple longitudinal bend lines BL into a hexagonal shape and then welded together along a vertical seam 112a formed by opposing vertical terminal edges of the bent plate as shown in the illustrated embodiment. Other fabrication methods may of course be used.

It will be appreciated that each tube 120 can be formed as a single unitary structural component that extends the entire desired height H1 of the tube (whether extruded or bent into shape), or can be constructed of multiple partial height tube segments that are vertically stacked and connected together at their ends such as by welding or other mechanical means which collectively add up to the desired full tube height H1. Such a fabrication technique is disclosed in commonly-owned U.S. Pat. No. 8,576,976 (see, e.g., FIG. 13), which is incorporated herein by reference. It is preferred that the height H1 of the tubes 120 be sufficient so that the entire height of a fuel assembly 30 may be contained within the tube when the fuel assembly is fully inserted into the tube. The top ends 112 of tubes 120 may preferably but not necessarily terminate in substantially the same top horizontal plane (defined perpendicular to vertical centerline axis CL) so that the tops of the tube are level with each other. The baseplate 102 at the bottom ends 114 of the tubes defines a second horizontal reference plane.

In alterative embodiments, a plurality of obliquely arranged interlocked and slotted flat plates could be used to form the hexagonal fuel storage cells 110 using a similar egg-crate construction method disclosed in commonly-owned U.S. Pat. No. 8,576,976 (see, e.g., FIGS. 10-12) or U.S. Pat. No. 10,854,346 (see, e.g., FIGS. 3-10). Present FIGS. 29 and 30 are referenced herein showing such a construction using slotted plates 400A, 400B, 400C adapted for forming an array of hexagonal cells 110 in lieu of the square cells shown in these patents which are instead designed to accept United States style square-sided fuel assembly.

Figure 29:
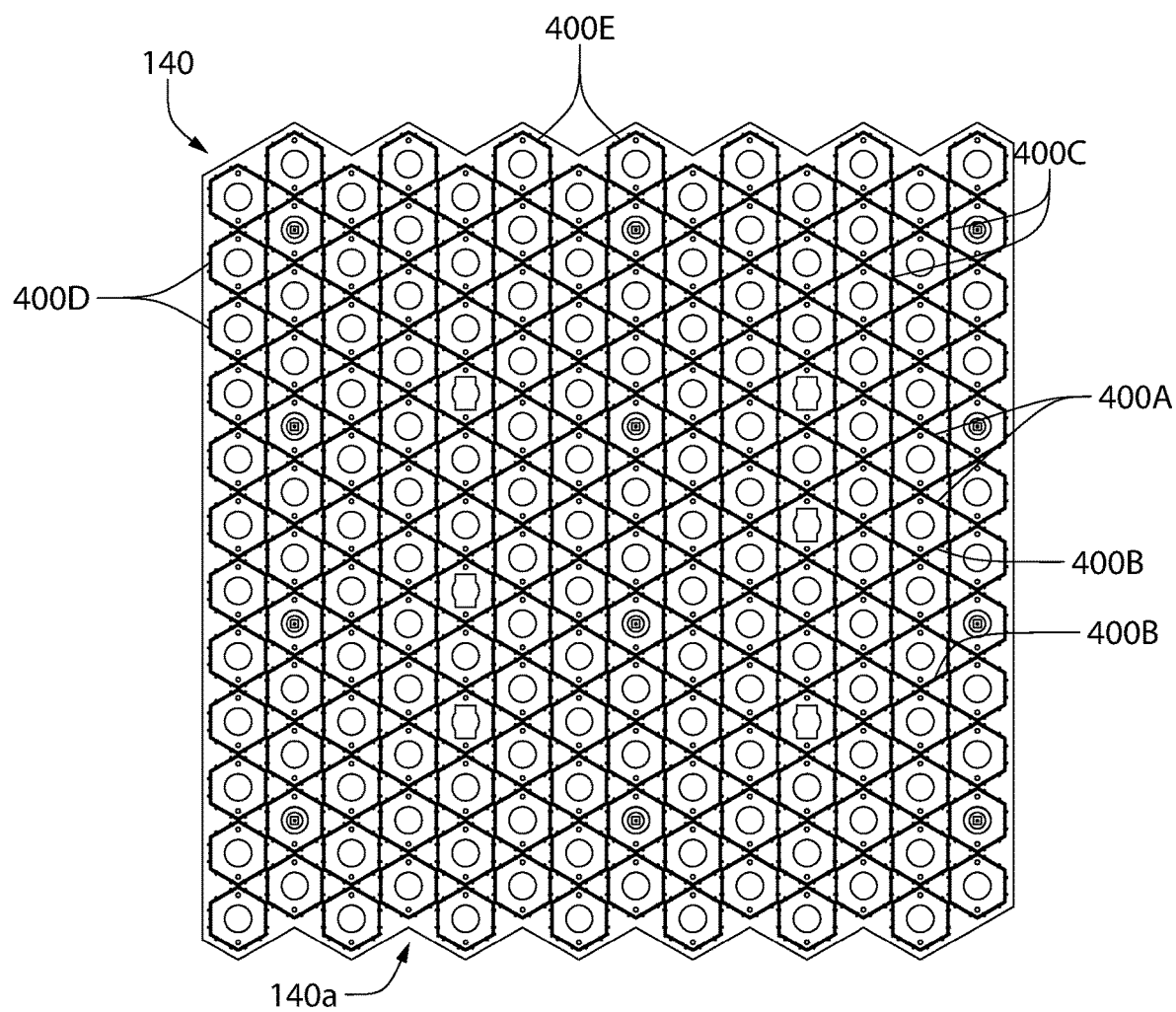
FIG. 29 is a top view showing an alternative construction of the fuel storage cells of the fuel rack using an array of intersecting slotted plates.
Figure 30:
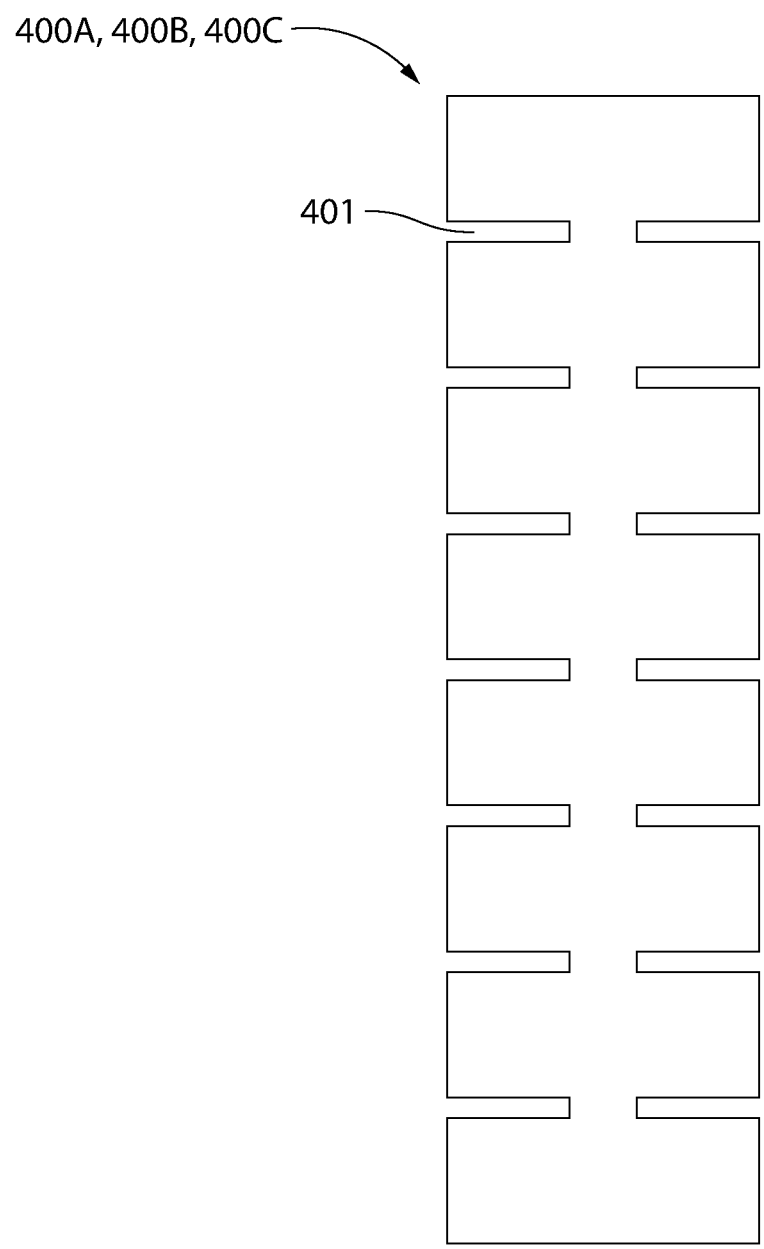
FIG. 30 is a side view of a representative one of the slotted plates usable to construct the fuel rack of FIG. 29.

Referring to FIGS. 29 and 30, two sets of horizontally elongated slotted plates 400A and 400B with slots 401 would be arranged which are interlocked in a classic harlequin (rhombus) gridded pattern in which the parallel plates of the first set obliquely intersect the parallel plates of the second set to first form elongated diamond-shaped cells. To produce the final hexagonal-shaped cells 110, a third set of horizontally elongated parallel plates 400C would be arranged to obliquely interlock and intersect the first and second set of plates 100A, 100B in which the third set of parallel plates extend through the previously formed diamond-shaped cell openings at two places. The end result is an array of hexagonal cells 110 seen in FIG. 29 which is similar in shape to that shown in FIGS. 4-6 and 14. Each slotted plate may include an appropriate number of slots formed in the top and bottom sides of the plates to form the interlocked plate structure.

To close the perimetrically arranged outermost peripheral cells 110, straight end plates 400D and chevron-shaped end plates 400E are provided and welded to the vertical edges of the slotted plates 400A-C as shown.

Each of the slotted plates 400A-C may have a lateral width which extends from one peripheral side 140a of the baseplate 140 to an opposite side as shown in FIG. 29. The slotted plates are therefore horizontally elongated having a greater lateral width than height (see, e.g., FIG. 30). Slotted plates 400A, 400B in the first and second sets of plates that form the precursor diamond-shaped cells 110 intersect the peripheral sides 140a of baseplate 140 at an oblique angle. By contrast, slotted plates 400C in the third set of plates which form the final hexagonal-step-shaped cells perpendicularly intersect respective opposing peripheral sides 140a of the baseplate. The slotted plates 400 A-C each have a height less than the full height H1 of the cellular body 101/cells 110 of the fuel rack. The full height is achieved by vertically stacking and interlocking tiers of the plates in the manner disclosed in the two above-referenced patents. The slotted plates 400A-C and end plates 400D, 400E may be welded together after placement to produce a rigid fuel rack structure capable of being lifted as a unitary structural unit.

It bears noting that in contrast to the slotted plates 400A-C, the end plates 400D, 400E may alternatively be vertically elongated and have a vertical height coextensive with the collective full height H1 of the slotted plates after assemblage to form the complete cell 110 height. The end plates may therefore be welded to the slotted plates after they are fully assembled. Of course in other possible constructions, the end plates may have a height coextensive with only the height of the slotted plates 400A-C such that the end plates are welded to each tier of the fuel rack cells are it is being built.

Figure 23:
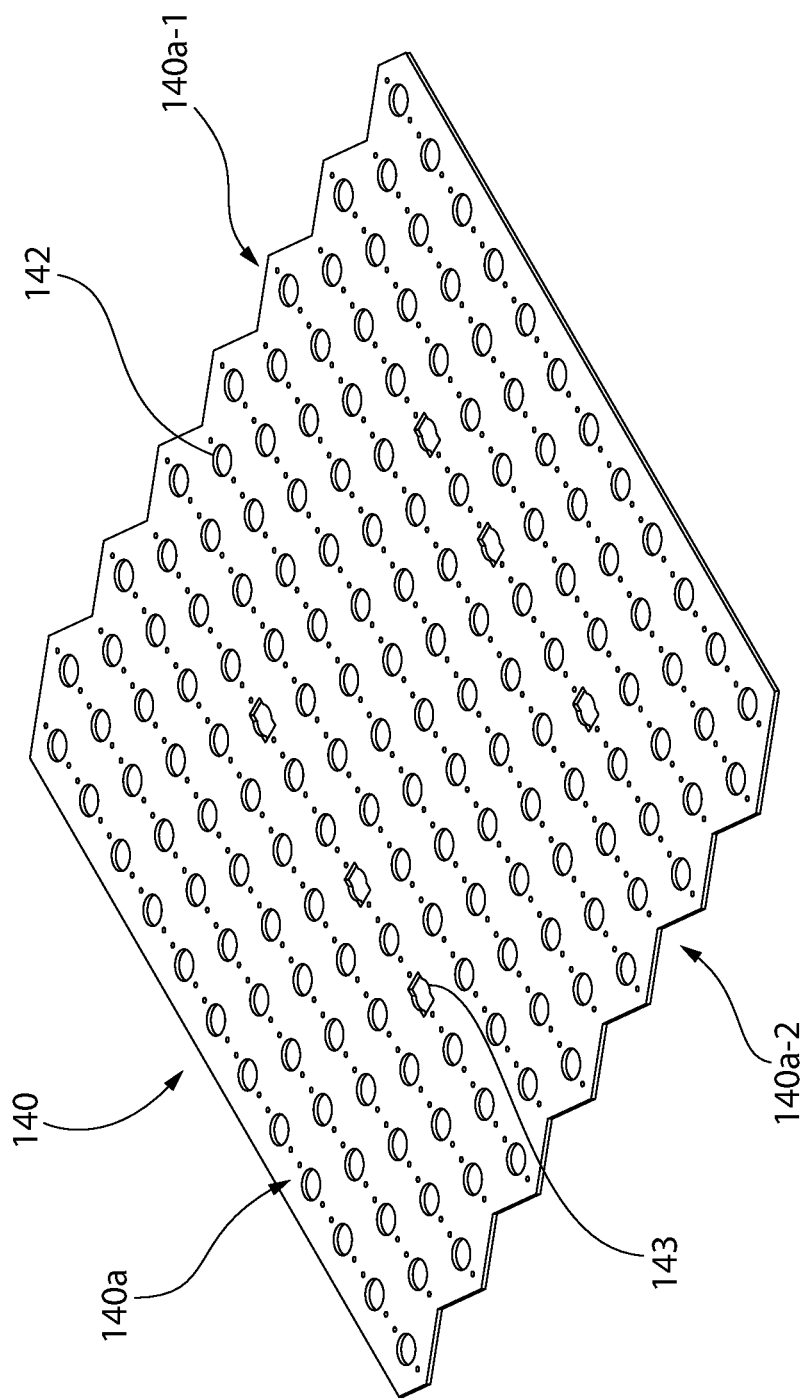
FIG. 23 is a top perspective view of the baseplate of the fuel rack.
Figure 24:
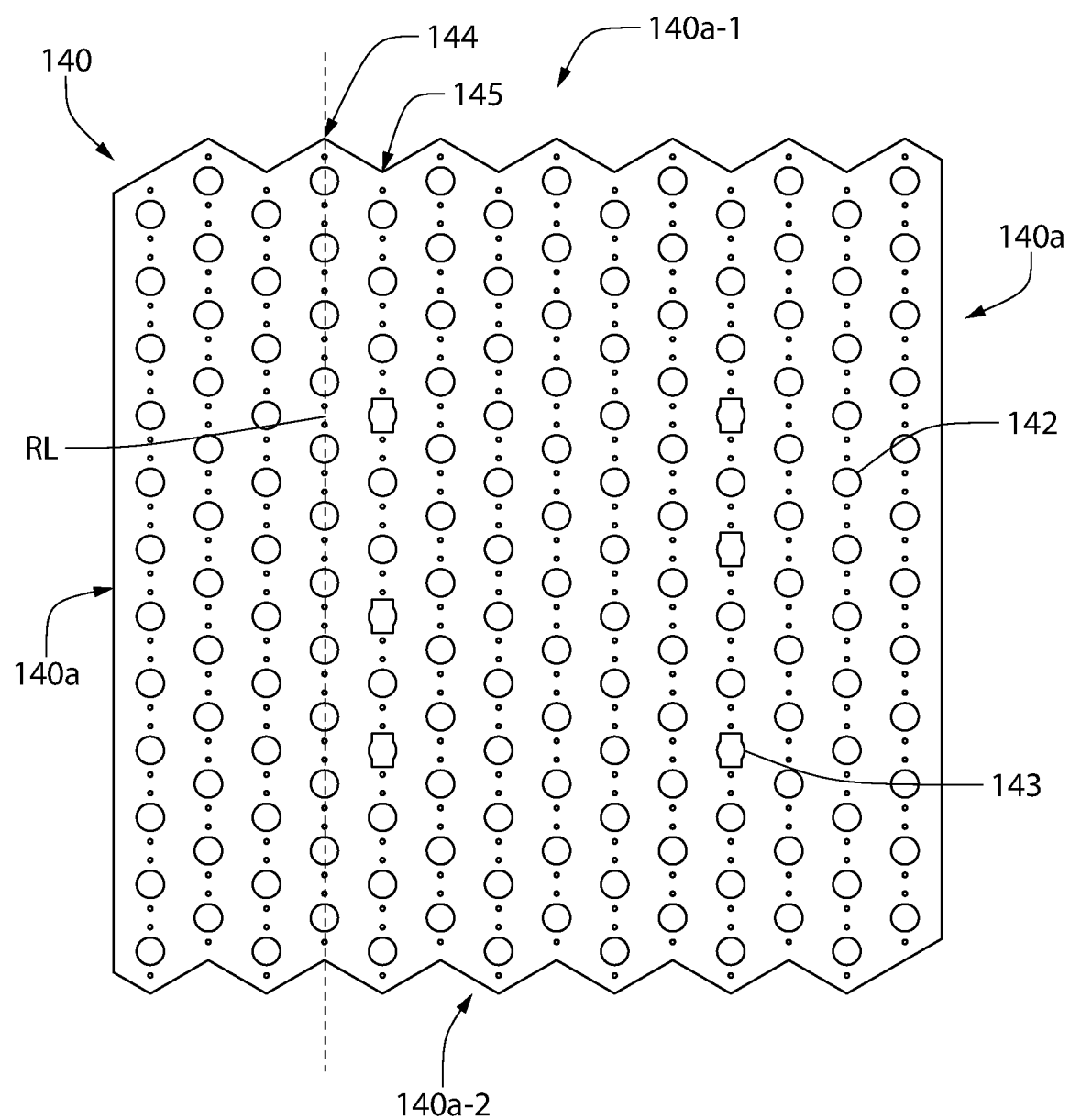
FIG. 24 is a top view thereof.
Figure 25:
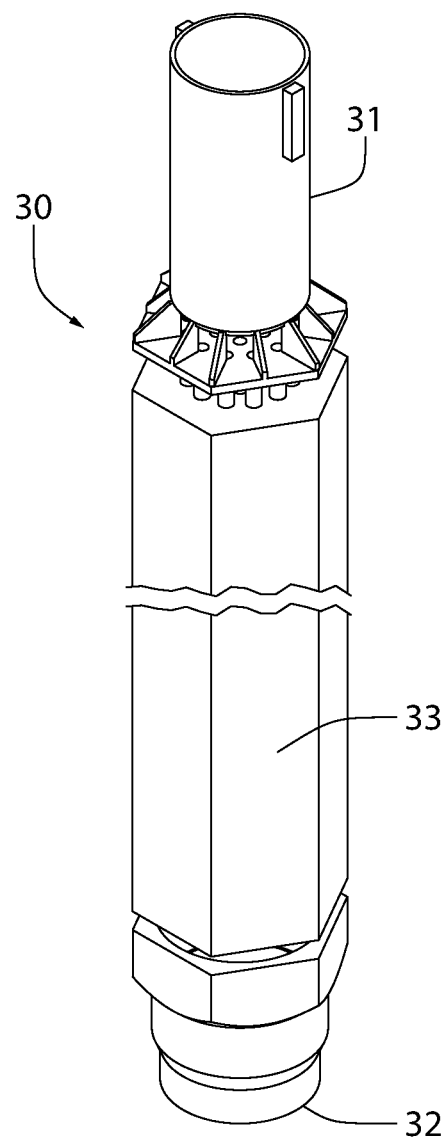
FIG. 25 is a top perspective view of a hexagonal nuclear fuel assembly usable in the storage cells of the fuel rack.
Figure 26:
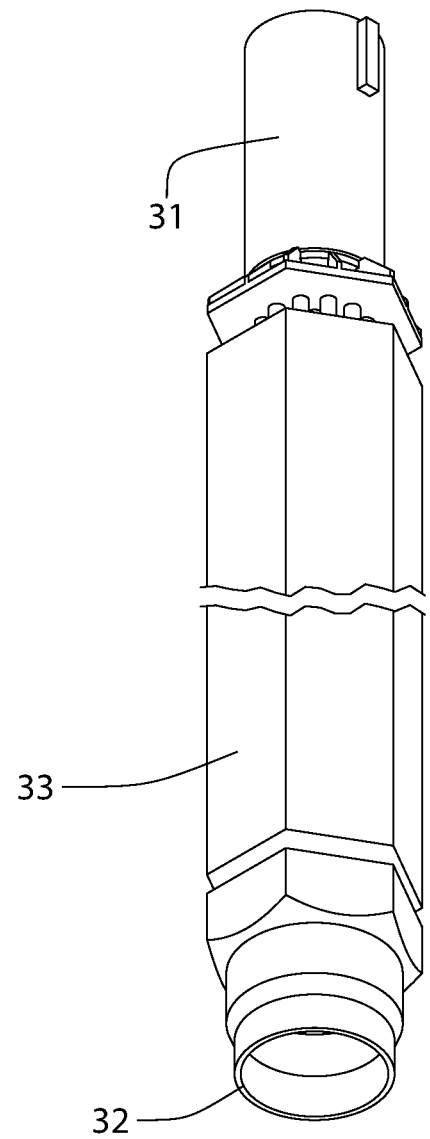
FIG. 26 is a bottom perspective view thereof.
Figure 27:
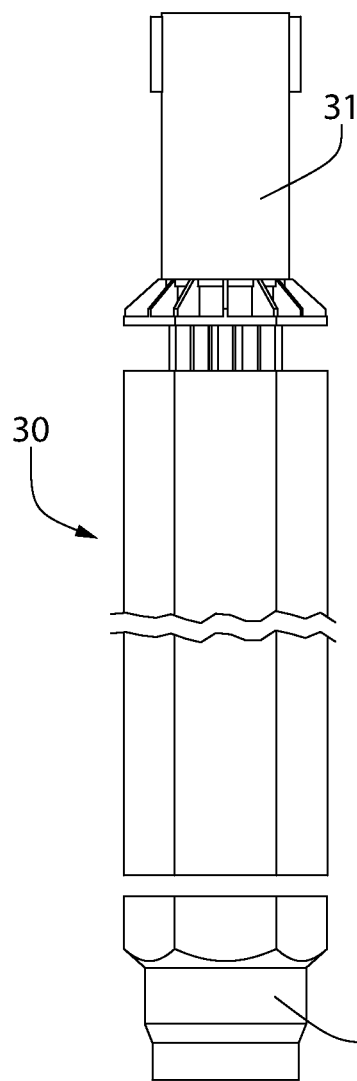
FIG. 27 is a first side view thereof.
Figure 28:
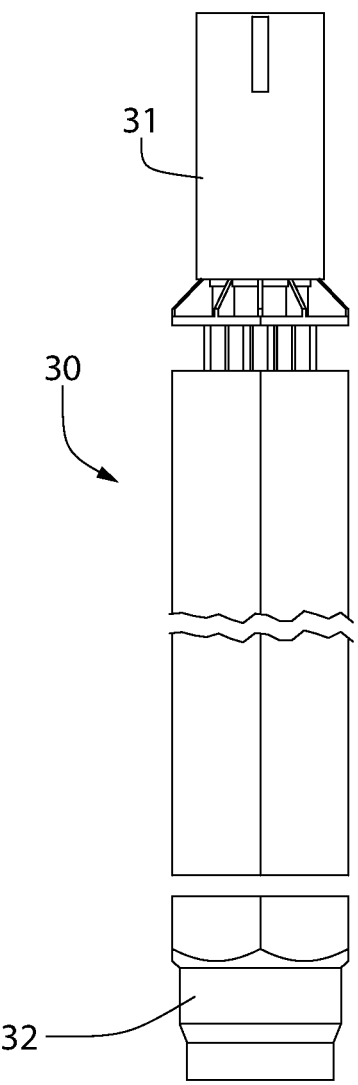
FIG. 28 is a second side view thereof.

FIGS. 23 and 24 show baseplate 140 of fuel rack 100 in isolation. Referring initially to FIGS. 1-2, 7, and 23-24, baseplate 140 comprises a flat planar body which may be rectilinear (i.e. square or rectangular) in configuration. The baseplate defines four peripheral edges or sides 140a which collectively define the perimeter of the baseplate. The peripheral sides 140a may be linear and straight, or at least some of the sides may have an undulating configuration further described herein to achieve greater fuel assembly packing density in the fuel rack 100. Baseplate 140 may be made of a similar or different corrosion resistant metal as the tubes (e.g., stainless steel) of suitable thickness to support the weight of the tubes 120 and fuel assemblies 30 when stored therein.

The baseplate of fuel rack 100 comprises a plurality of legs or pedestals 141 which support the rack from the floor slab 42 of the fuel pool 40. Pedestals 141 may each have a flat bottom end to engage the pool floor slab 42 and a top end fixedly attached to the bottom of baseplate 140 such as via welding. The pedestals 141 protrude downwards from baseplate 140 and are laterally spaced apart from each other and located at appropriate points on the baseplate to properly support fuel rack 100. This elevates and spaces the baseplates 102 of the rack off the floor slab 42, thereby forming a gap therebetween which defines a bottom flow plenum P beneath rack 100. The plenum P allows cooling water W in the pool to create a natural convective circulation flow path beneath the rack and enter through the bottom ends each of the fuel storage tubes 120.

A plurality of flow holes 142 are formed in the rack through baseplate 140 in a conventional manner to allow cooling water to flow from plenum P beneath the baseplate upwards through the cell cavity 118 of each tube 120 and then outwards through the open top ends 113 of the tubes. The pool water W flowing through the tubes 120 is heated by the nuclear fuel in fuel assemblies when emplaced in the cells 110 of the tubes, thereby creating the motive force driving the natural thermal convective flow scheme. Flow holes 142 may be circular in some embodiments. Some flow holes 143 may be configured differently than the normal majority of flow holes in baseplate 140 to also provide rigging attachment points for raising and lowering empty fuel racks out from and into fuel pool 40. These rigging-associated flow holes however function in the same manner to introduce pool water W into the bottom of the tubes 120 for cooling the fuel assemblies 30 which are storage therein.

Accordingly, flow holes 142 and 143 create passageways from below the baseplate 140 into the cells 110 formed by the tubes 120. Preferably, a single flow hole 142 is provided for each cell 110, however, additional holes may be used as needed to create sufficient flow through the tubes to cool the fuel assemblies 30. The flow holes 142 are provided as inlets to facilitate natural thermosiphon flow of pool water through the fuel storage cells 110 when fuel assemblies emitting heat are positioned therein. More specifically, when heated fuel assemblies are positioned in the cells 110 in a submerged environment, the water within the cells surrounding the fuel assemblies becomes heated, thereby rising due to decrease in density and increased buoyancy creating a natural upflow pattern. As this heated water rises and exits the cells 110 via the tube open top ends 113, cooler water W in the fuel pool 40 is drawn into the bottom of the cells through the flow holes 115 and flows upward through the fuel assembly to cool the fuel. This heat induced water flow and circulation pattern along the fuel assemblies then continues naturally to dissipate heat generated by the fuel assemblies. Pedestals 141 may therefore have a height selected to form a bottom flow plenum P of generally commensurate height to ensure that sufficient thermally-induced circulation is created to adequately cool the fuel assembly. In one non-limiting example, the height of the plenum P may be about 2 to 2.5 inches (including the listed values and those therebetween of this range).

According to one unique aspect of the invention, the baseplate 140 of fuel rack 100 may be configured to be closely nested at least partially inside adjacent fuel racks on the fuel pool floor slab 42. This allows the fuel racks to be tightly packed into the fuel pool so as to increase the fuel assembly storage capacity of the pool. This is especially useful for existing fuel pools of fixed and limited dimension.

To accomplish this, at least one first peripheral side 140a of baseplate 140 has a non-linear profile which comprises an undulating "sawtooth" configuration defining a series of alternating peaks 144 and valleys 145 as shown for example in FIGS. 2-4, 7, 15, and 23-24. The peaks and valleys may be V-shaped as shown in the non-limiting illustrated embodiment; however, arcuately curved peaks and valleys of the undulating peripheral side configuration may also be used such that there are no pointed peaks and valleys. Alternatively, the pointed terminal tips and recesses of a V-shaped peripheral side configuration of the baseplate may be cut straight and truncated so as to produce peaks and valleys of trapezoidal shape. Other undulating configurations are possible. Accordingly, numerous variations of the sawtooth-configured peripheral sides 140a of the fuel rack baseplate may be provided and fall within the scope of the present disclosure so long as recesses of any shape are formed which receive complementary configured peaks of an adjoining fuel rack baseplate to allow the two adjoining baseplates to be nested.

Figure 4:
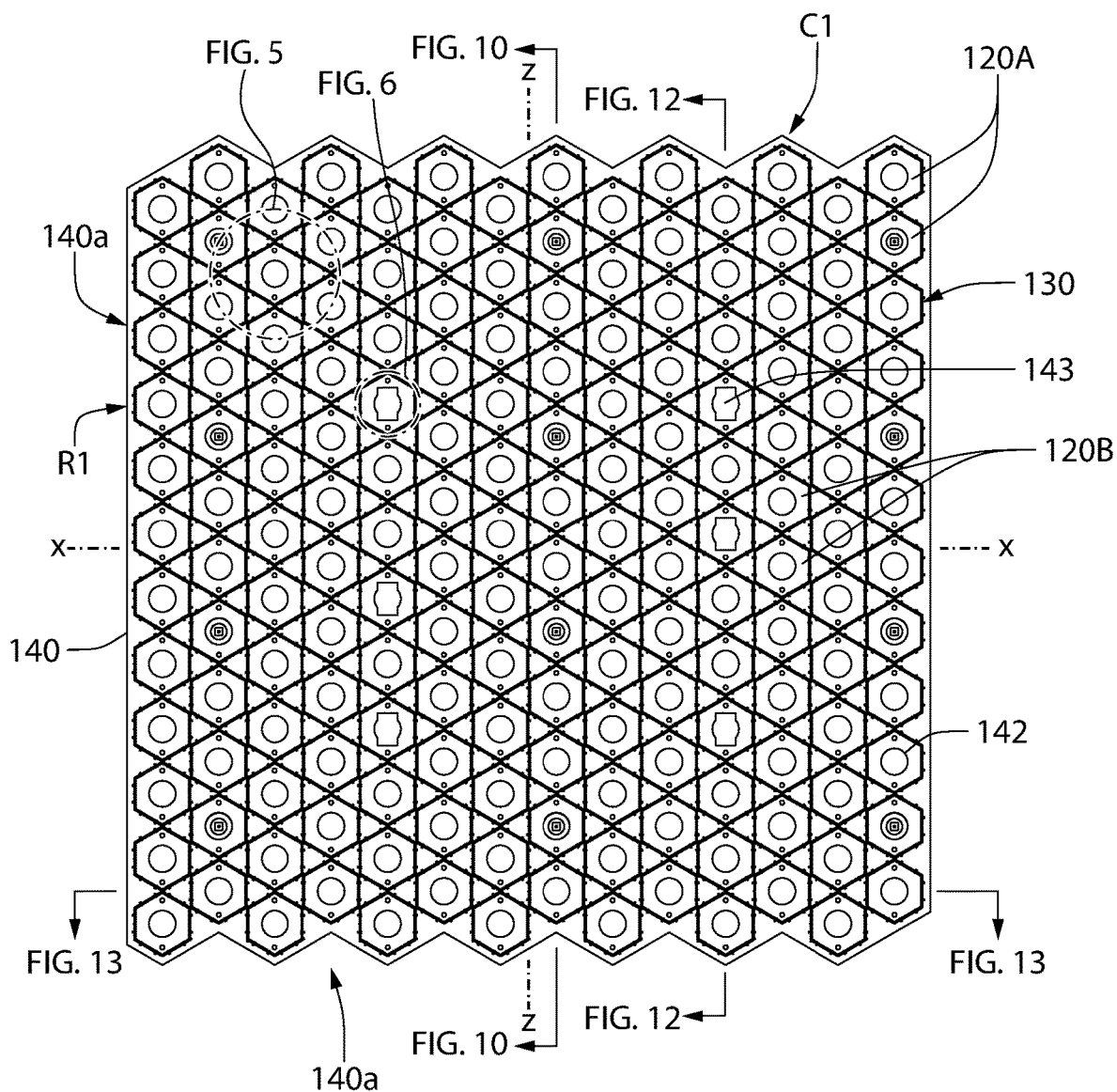
FIG. 4 is a top view of the fuel rack.

In some embodiments, a second peripheral side 140a of the baseplate 140 opposite the first peripheral side may also comprise a non-linear profile such as an undulating configuration defining a series of alternating peaks and valleys as shown. This is useful particularly for interior fuel racks 100 in the fuel pool 40 not placed along the perimeter of the pool adjacent the pool walls 41. This is possible due to the single corner-to-corner alignment between adjacent cells 110 of the fuel rack as shown in FIG. 4 and further described herein where there is no face-to-face meeting of the cells and tubes 120. The remaining two peripheral sides of baseplate 140 may have a straight configuration as shown. In some embodiments, three or all four sides of the fuel rack baseplate may have undulating configuration with a series of peaks and valley. Of course some baseplates as seen in the illustrated embodiment may have a combination of straight linear peripheral sides and undulating sides depending on the placement, loading, and number of fuel racks on the floor of the fuel pool 40.

Figure 15:
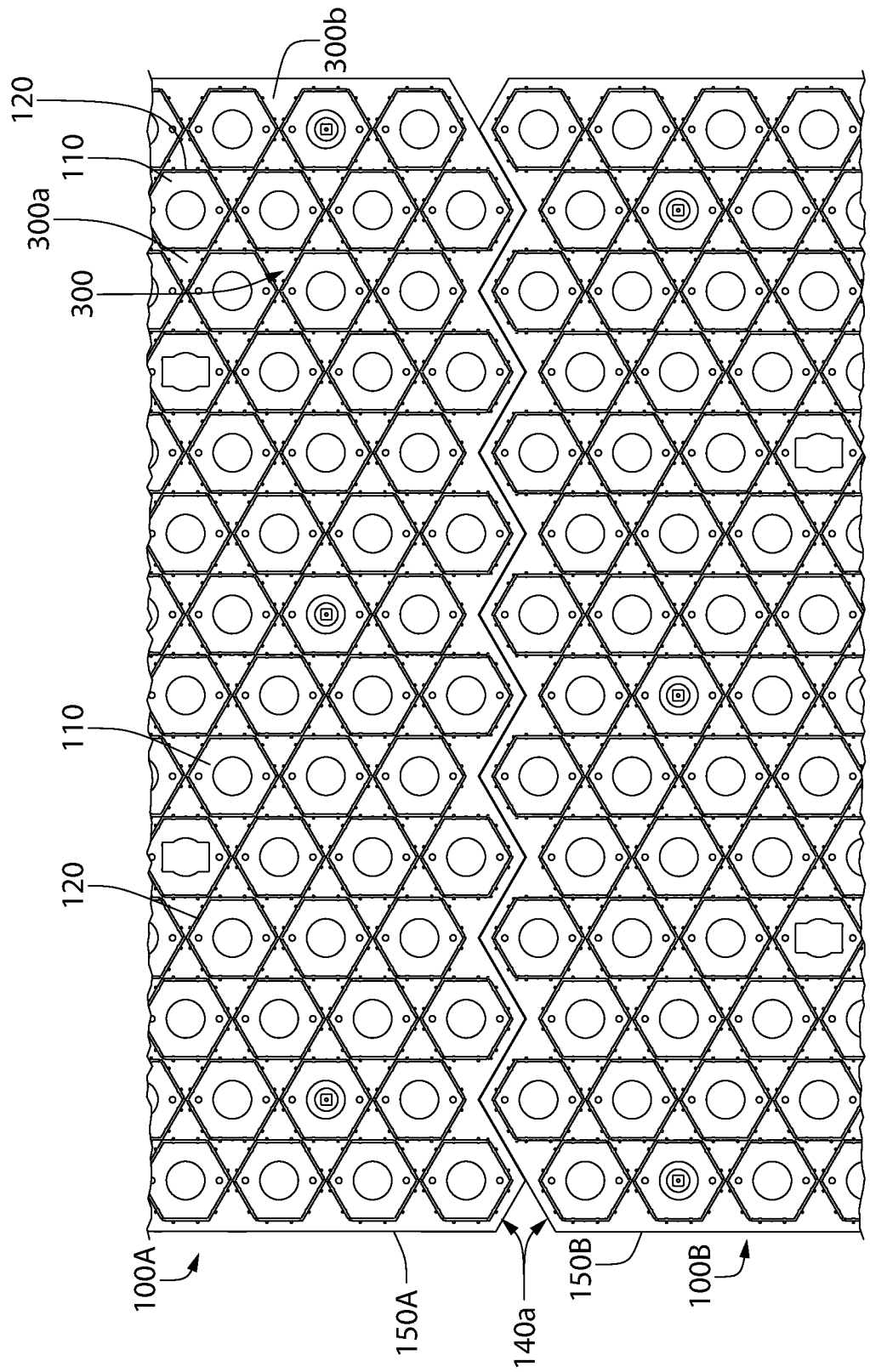
FIG. 15 is a top view of a pair of adjacent fuel racks with undulating sides of the baseplate of each rack partially nested in the other for high density packing of racks in the fuel pool.
Figure 16:
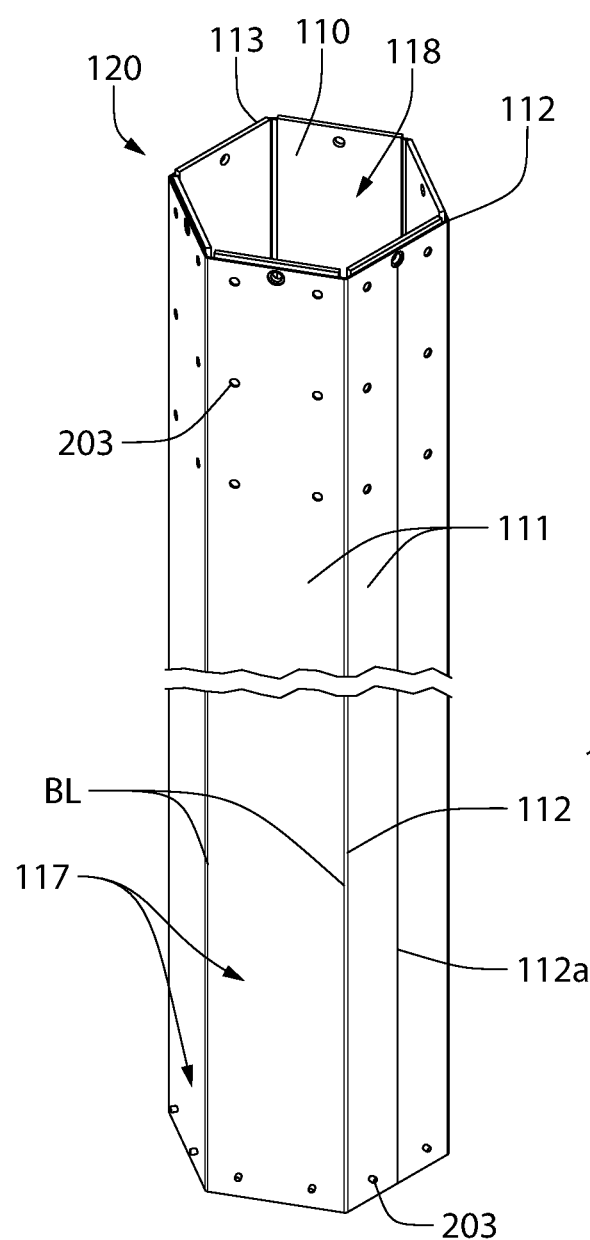
FIG. 16 is a top perspective view of a fuel storage tube of the fuel rack which defines a fuel storage cell.
Figure 17:
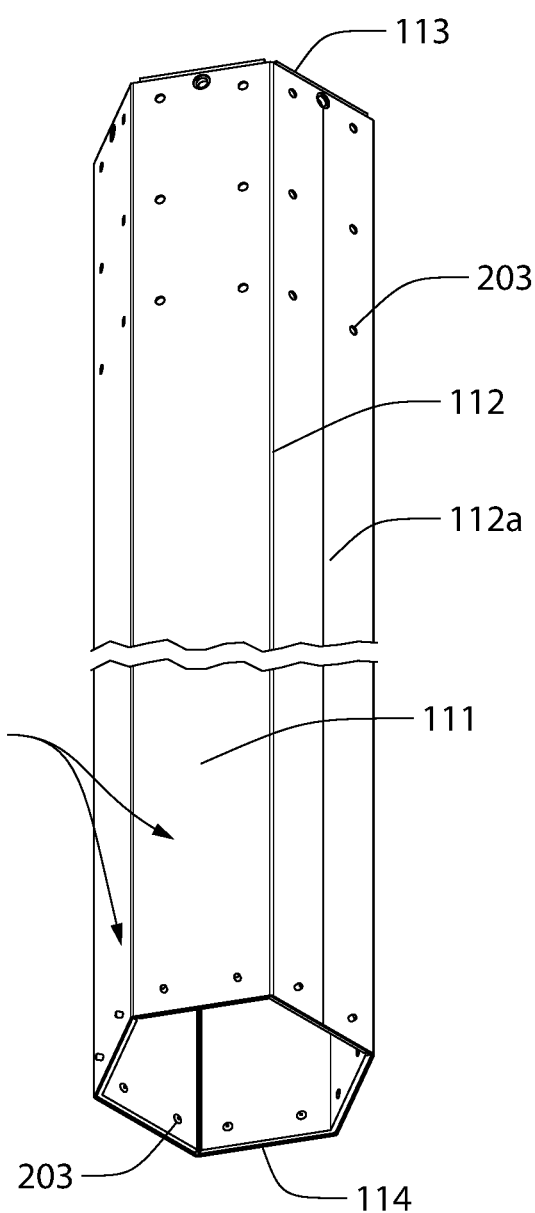
FIG. 17 is a bottom perspective view thereof.
Figure 18:
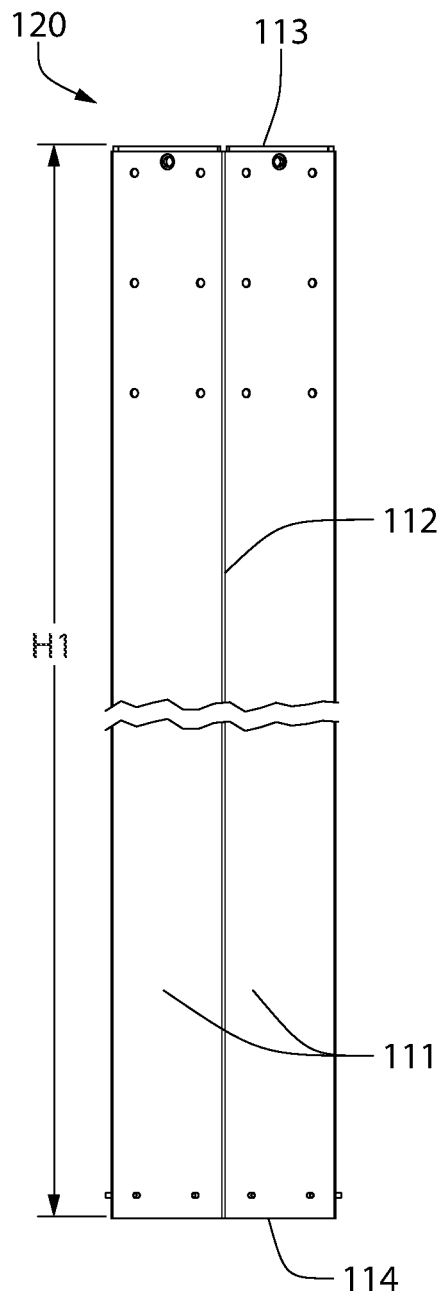
FIG. 18 is a first side view thereof.
Figure 19:
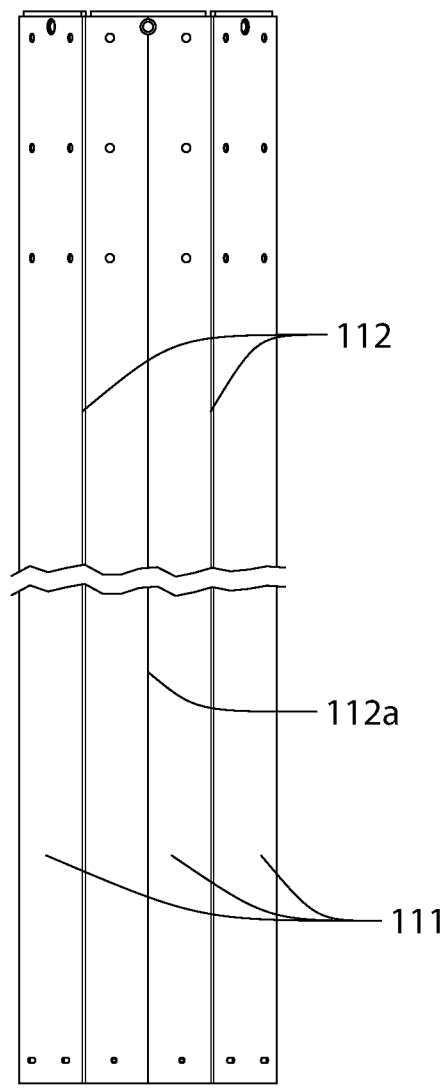
FIG. 19 is a second side view thereof.
Figures 20, 21:
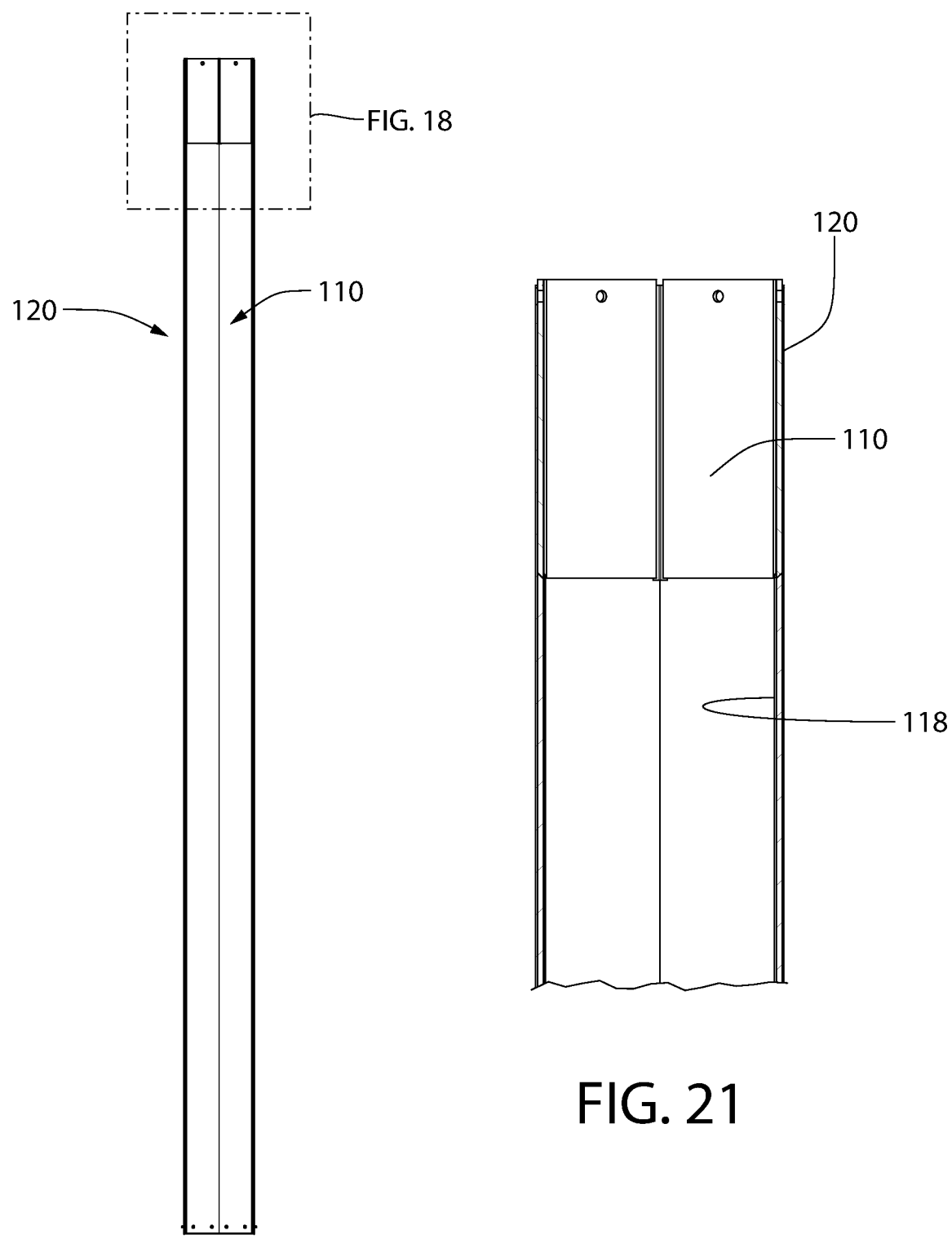
FIG. 20 is a vertical side cross-sectional view thereof.
FIG. 21 is an enlarged detail taken from FIG. 20.

FIG. 15 shows a first fuel rack 100A with first baseplate 150A partially nested with a second baseplate 150B of an adjacent second fuel rack 100B. The undulating peripheral sides 140a (e.g., sawtooth) of each rack are mated together and may be mutually engaged. Thought of another way, the two baseplates are fitted together like puzzle pieces. To allow this meshed arrangement, the peaks and valleys 144, 145 of the first baseplate 150A are laterally offset with respect to the peaks and valleys of the second baseplate 150B as shown. Accordingly, when the two fuel racks are positioned together, the peaks on the first baseplate 140 become aligned with the valleys on the second baseplate 140B, and vice-versa. For each fuel rack 150A, 150B therefore, it can be seen in FIG. 24 that the peaks 144 on a first peripheral side 140a-1 of each rack are aligned with the valleys 145 on the second peripheral side 140a-2 of the same rack to produce the foregoing lateral offset (see reference line RL).

A method for storing nuclear fuel in a fuel pool in a tightly packed configuration is briefly summarized and comprises steps which may include positioning a first fuel rack 100 on a floor (e.g., floor slab 42 with or without a liner 60) of the fuel pool 40. The first fuel rack comprises a first baseplate defining a first undulating peripheral side previously described herein. The method continues with next positioning a second fuel rack on the floor of a fuel pool comprising a second baseplate defining a second undulating peripheral side, and nesting the second undulating peripheral side of the second baseplate at least partially within the first undulating peripheral side of the first baseplate.

It bears noting that the fuel rack baseplate can have one or more peripheral sides with the undulating (e.g., sawtooth configuration) to achieve a higher packing density of fuel assemblies in each rack, or all four peripheral sides may be linearly straight. In addition, for any given fuel pool, some of the fuel racks may have four conventional straight or linear peripheral sides whereas others may include one or more sawtooth peripheral sides. Accordingly, numerous configurations of fuel rack baseplate peripheral sides may be used and combined in various ways thereby providing greater fuel storage versatility and packing density.

According to another aspect of the invention which allows the undulating peripheral sides 140a of the fuel rack baseplates 140 to be provided as discussed above, a staggered array of fuel storage cells 110 is provided. As best shown in FIG. 4, fuel storage tubes 120 are geometrically arranged atop the baseplate 140 in a series of rows R1 and columns C1 along the X-axis and Z-axis and X-axis, respectively. The tubes 120 in each row R1 are laterally offset in the X-direction from the tubes in the adjacent row on either side. Similarly, tubes 120 in each column C1 are laterally offset in the Z-direction from the tubes in the adjacent row on either side. Any suitable array size including equal or unequal numbers of tubes in each row and column may be provided depending on the horizontal length and width of the fuel racks 100 to be provided. In some arrangements, some of the fuel racks 100 may have unequal lateral width and lateral length as to best make use of a maximum amount of available floor slab surface area in fuel pool 40 as possible for each installation.

Figure 5:
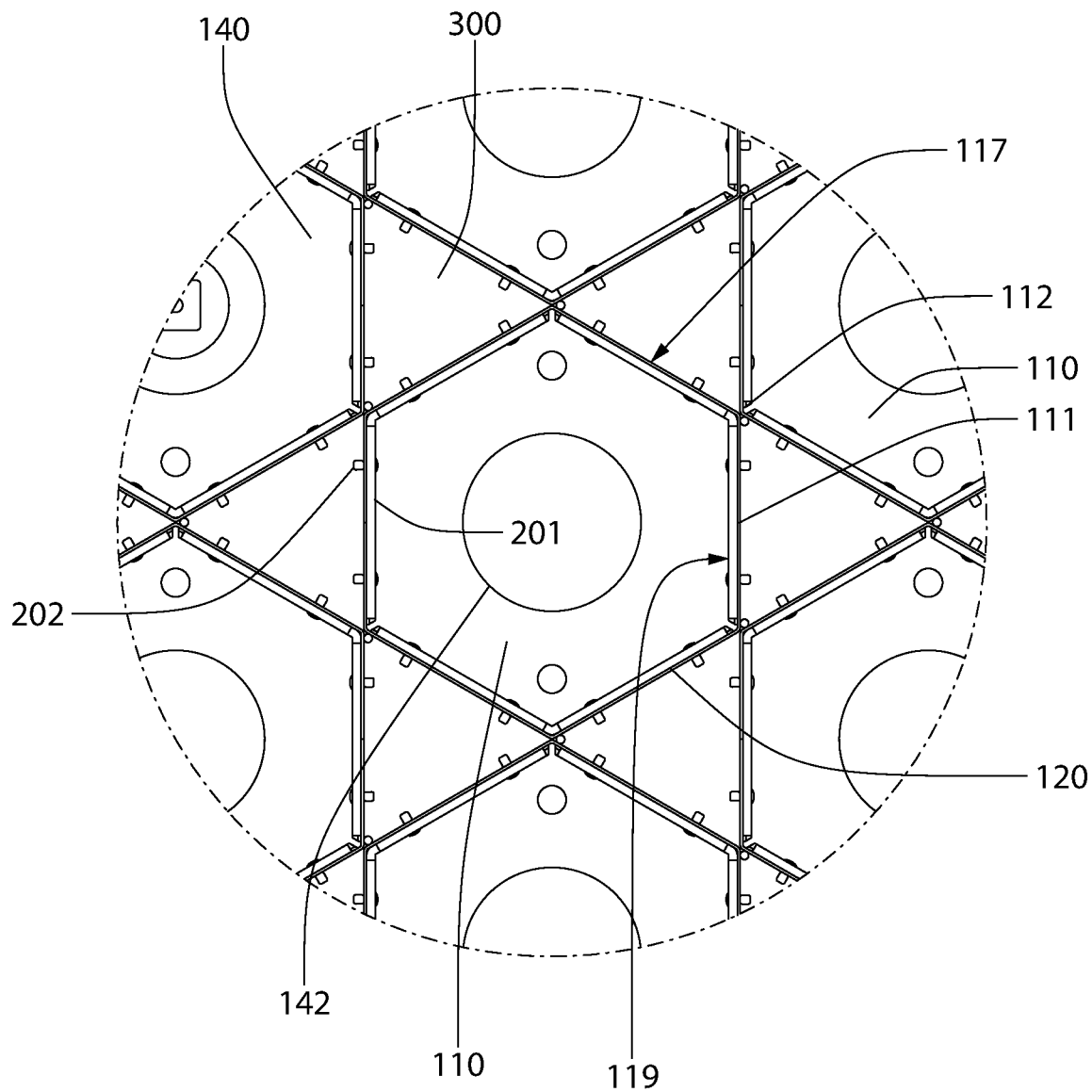
FIG. 5 is a first enlarged detail taken from FIG. 4.
Figure 6:
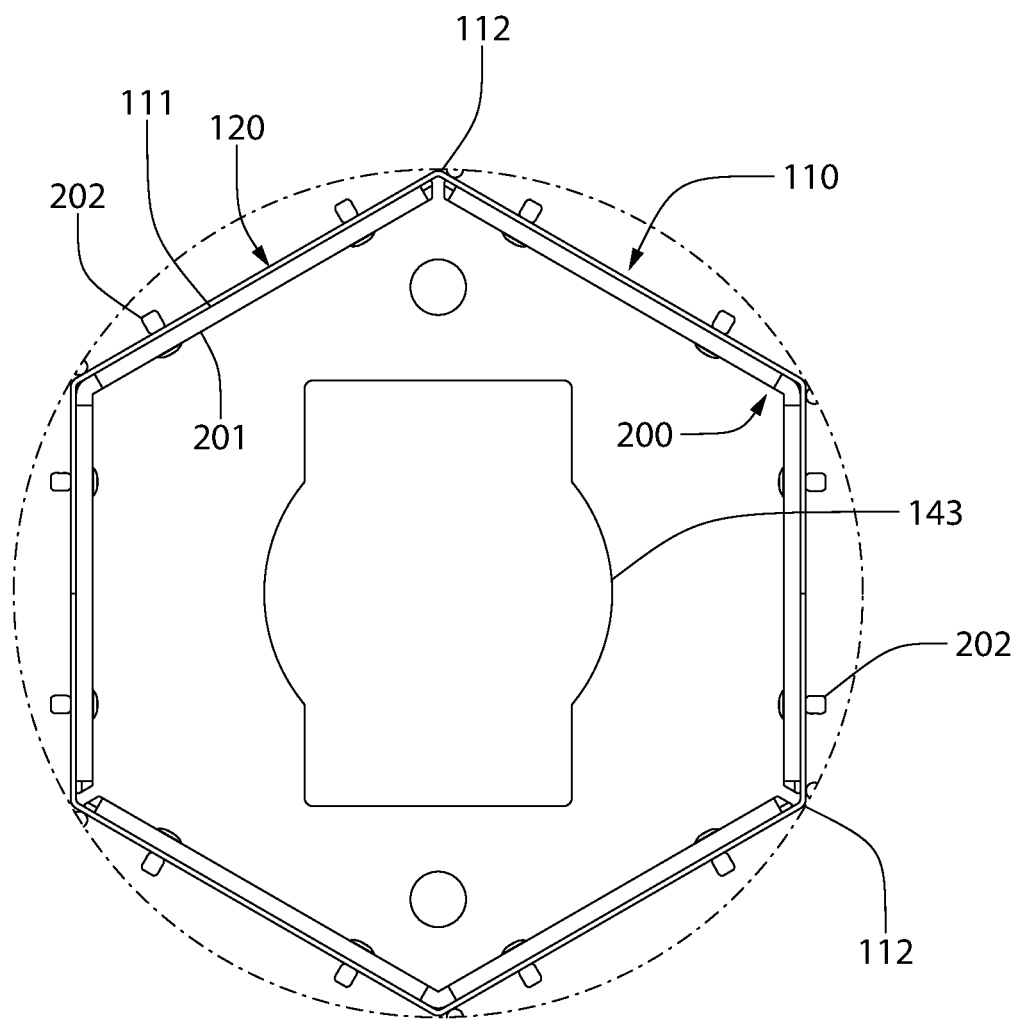
FIG. 6 is a second enlarged detail taken from FIG. 5.
Figure 7:
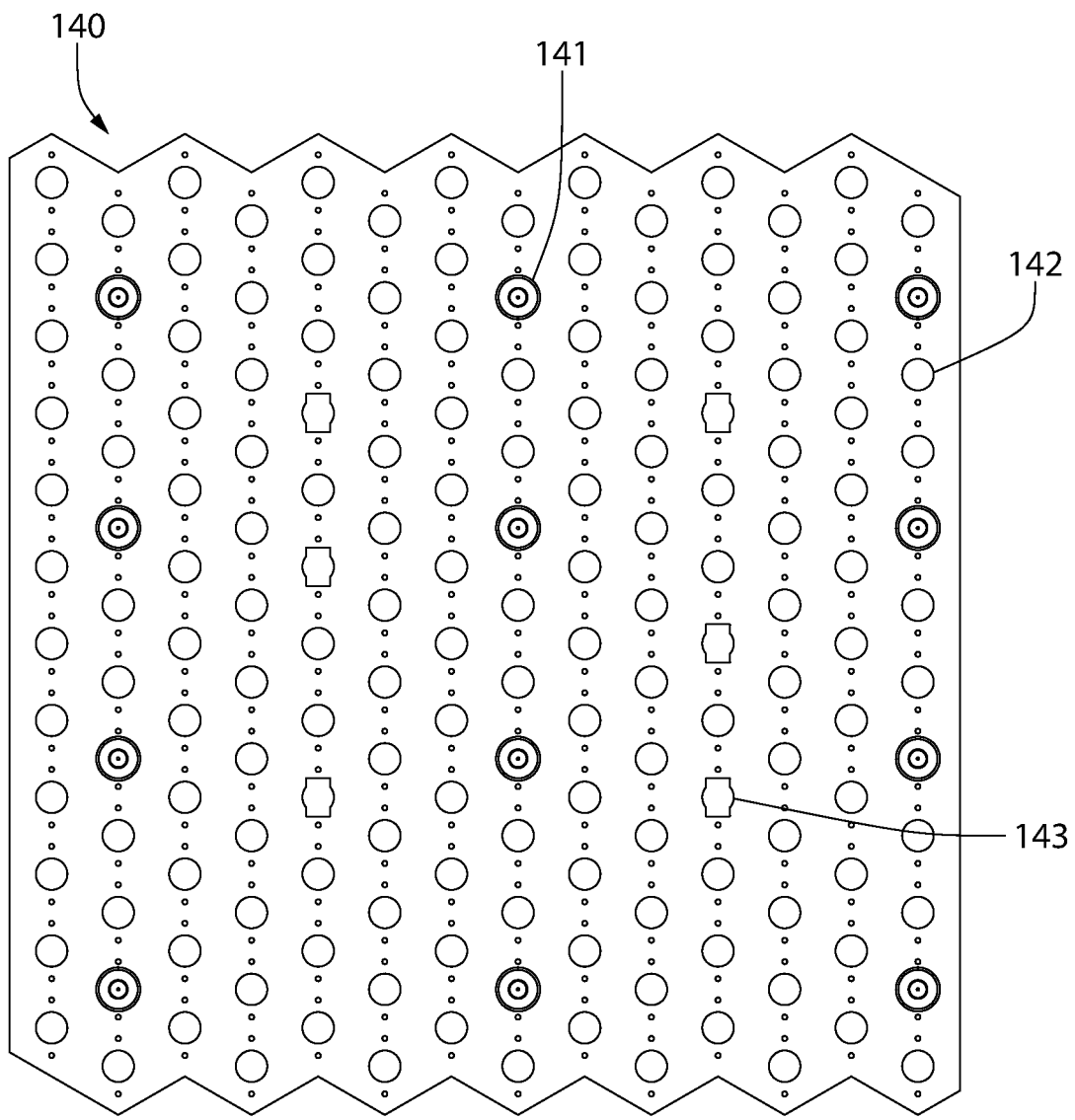
FIG. 7 is a bottom view of the fuel rack.
Figure 8:
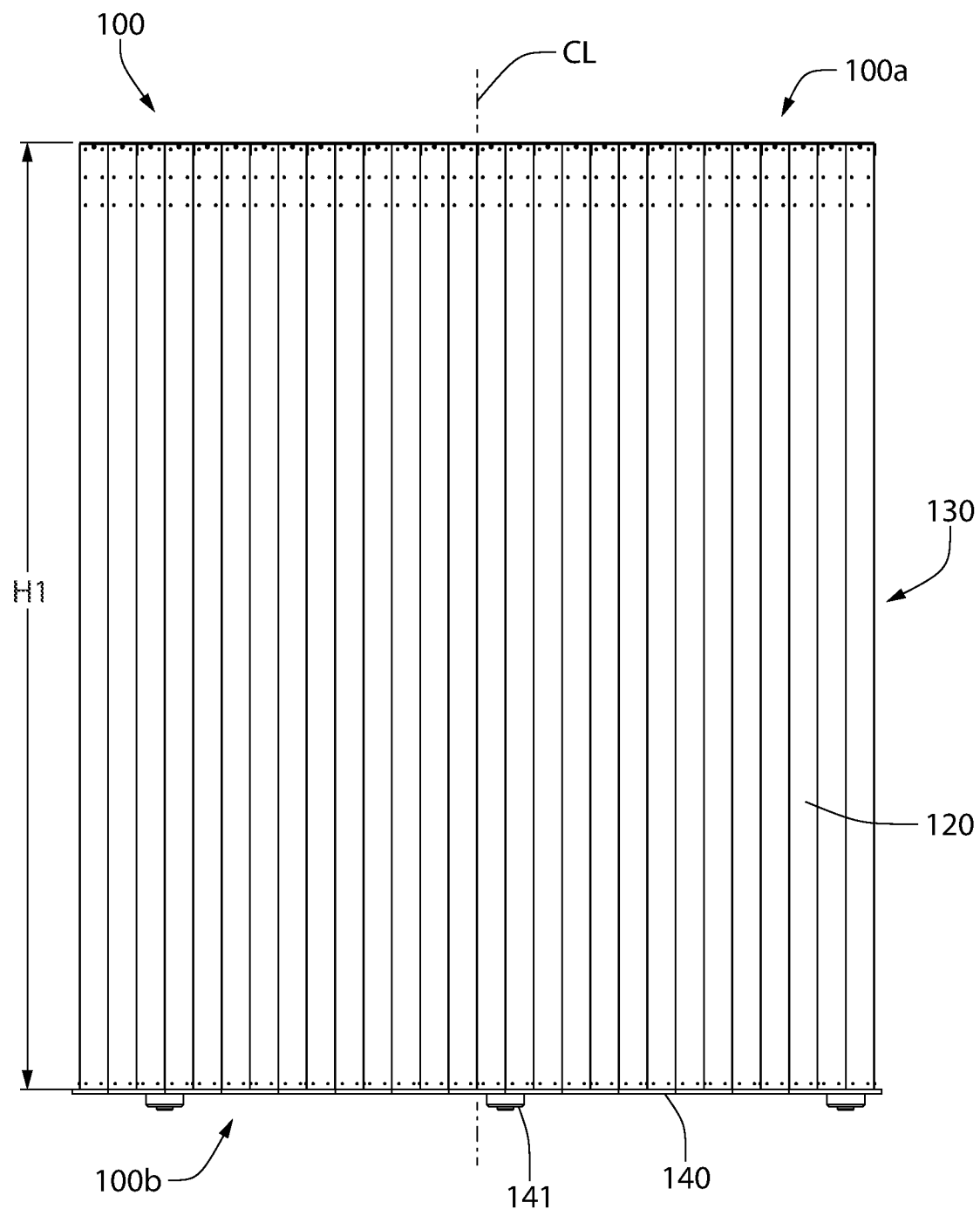
FIG. 8 is a first side view of the fuel rack.
Figure 9:
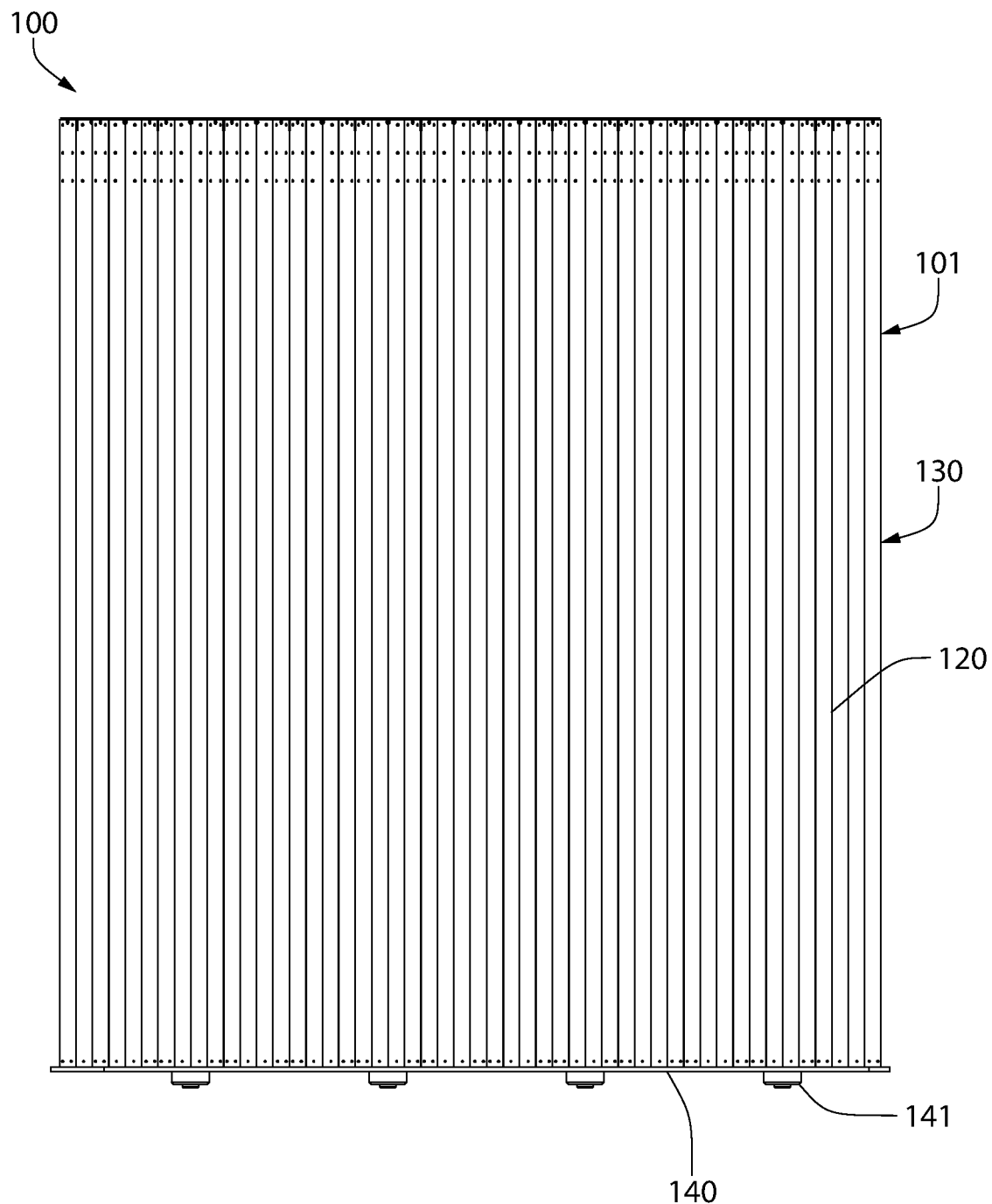
FIG. 9 is a second side view of the fuel rack.
Figure 10:
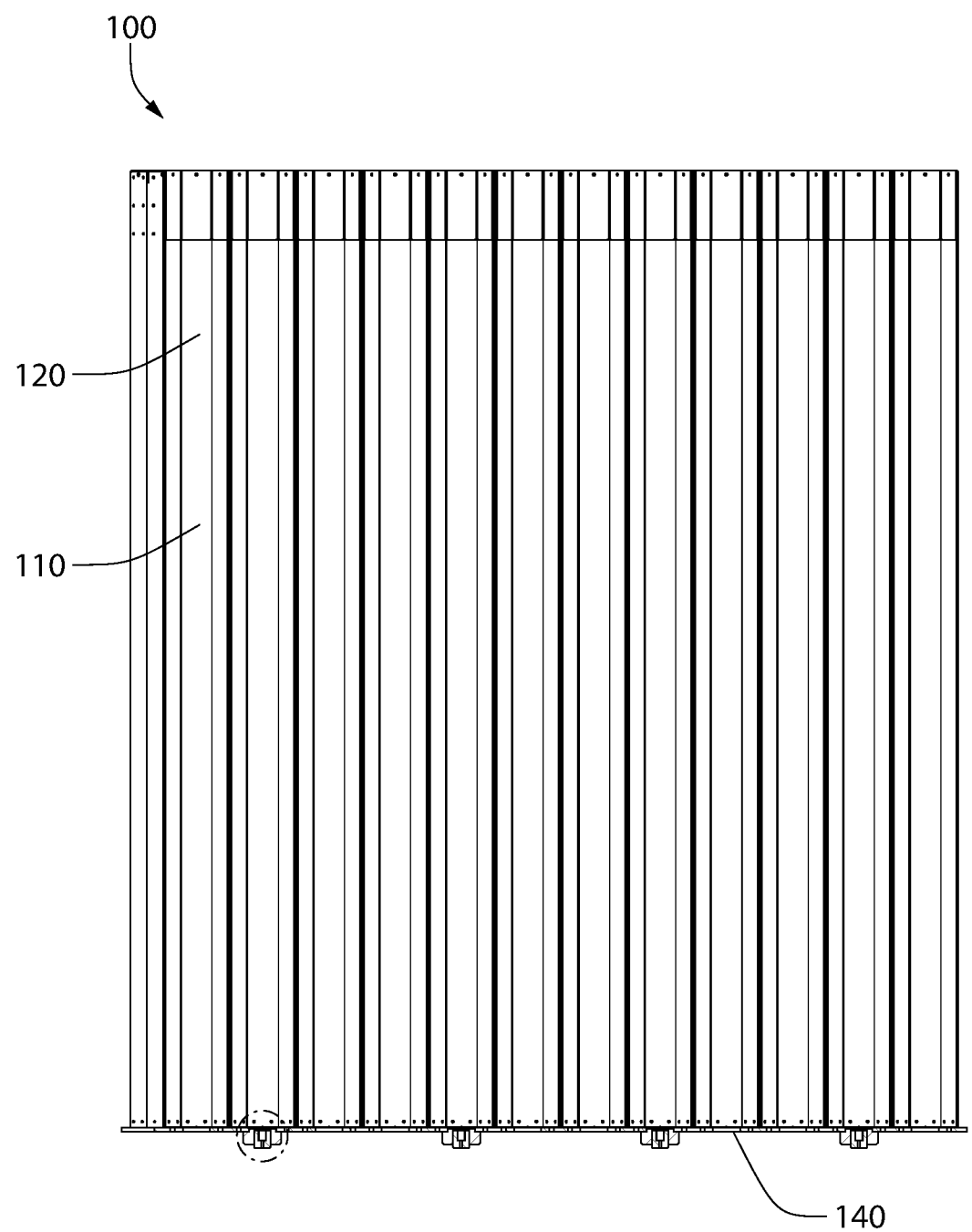
FIG. 10 is a first cross sectional view of the fuel rack.
Figure 11:
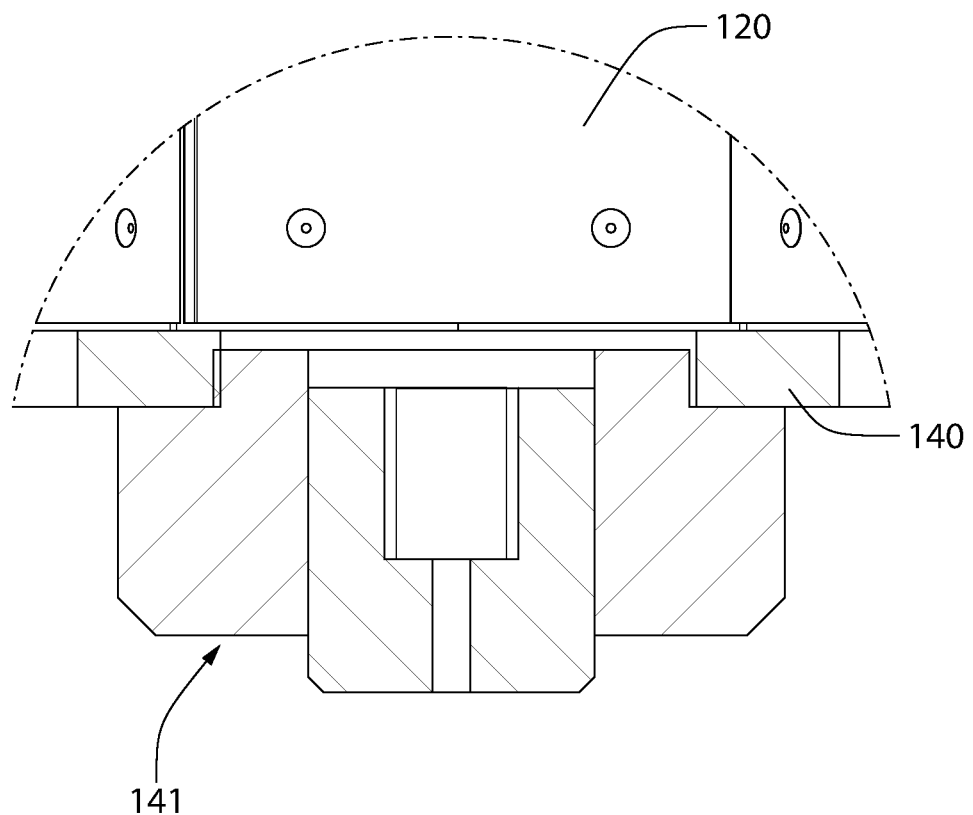
FIG. 11 is an enlarged detail taken from FIG. 10.
Figure 12:
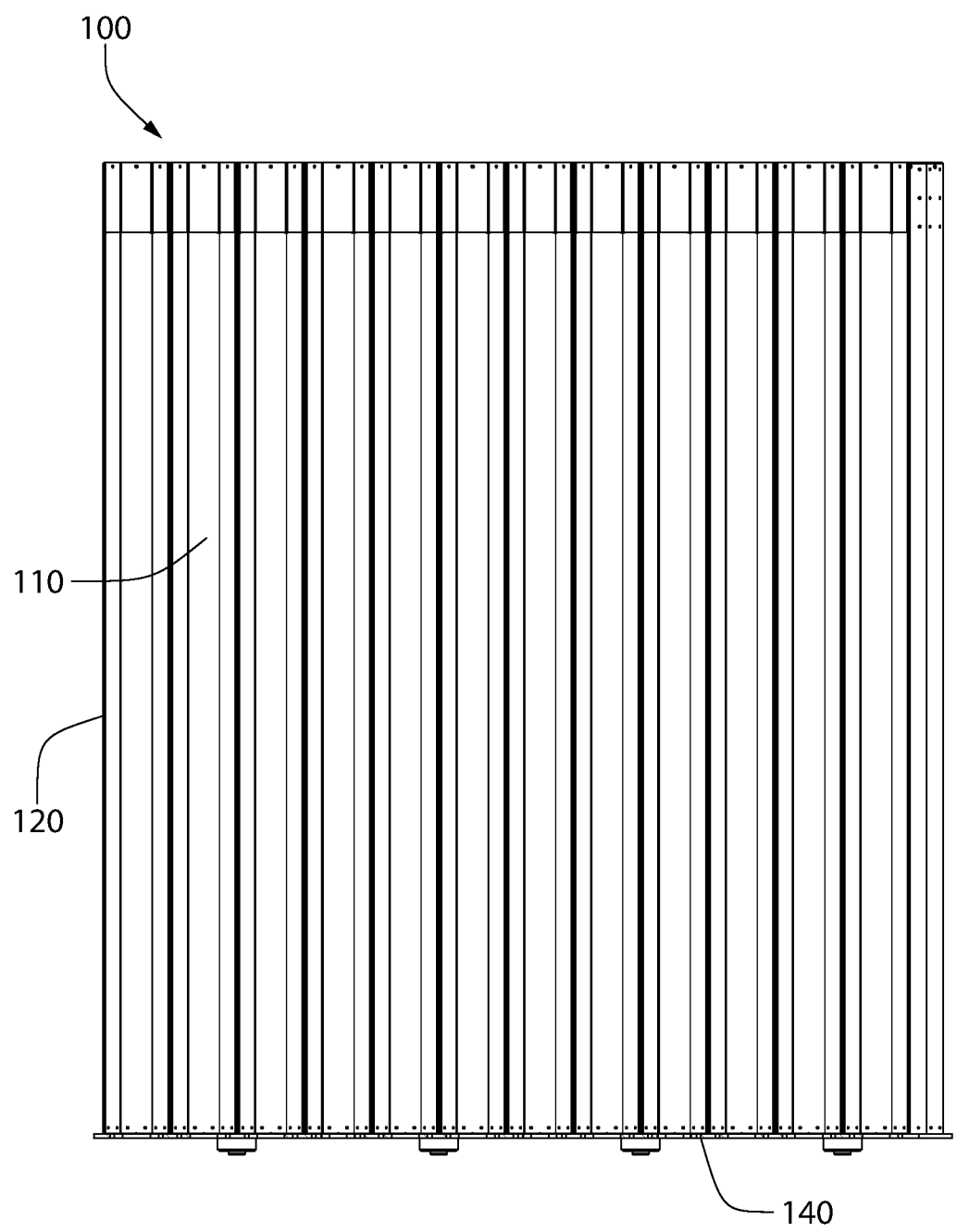
FIG. 12 is a second cross sectional view of the fuel rack.
Figure 13:
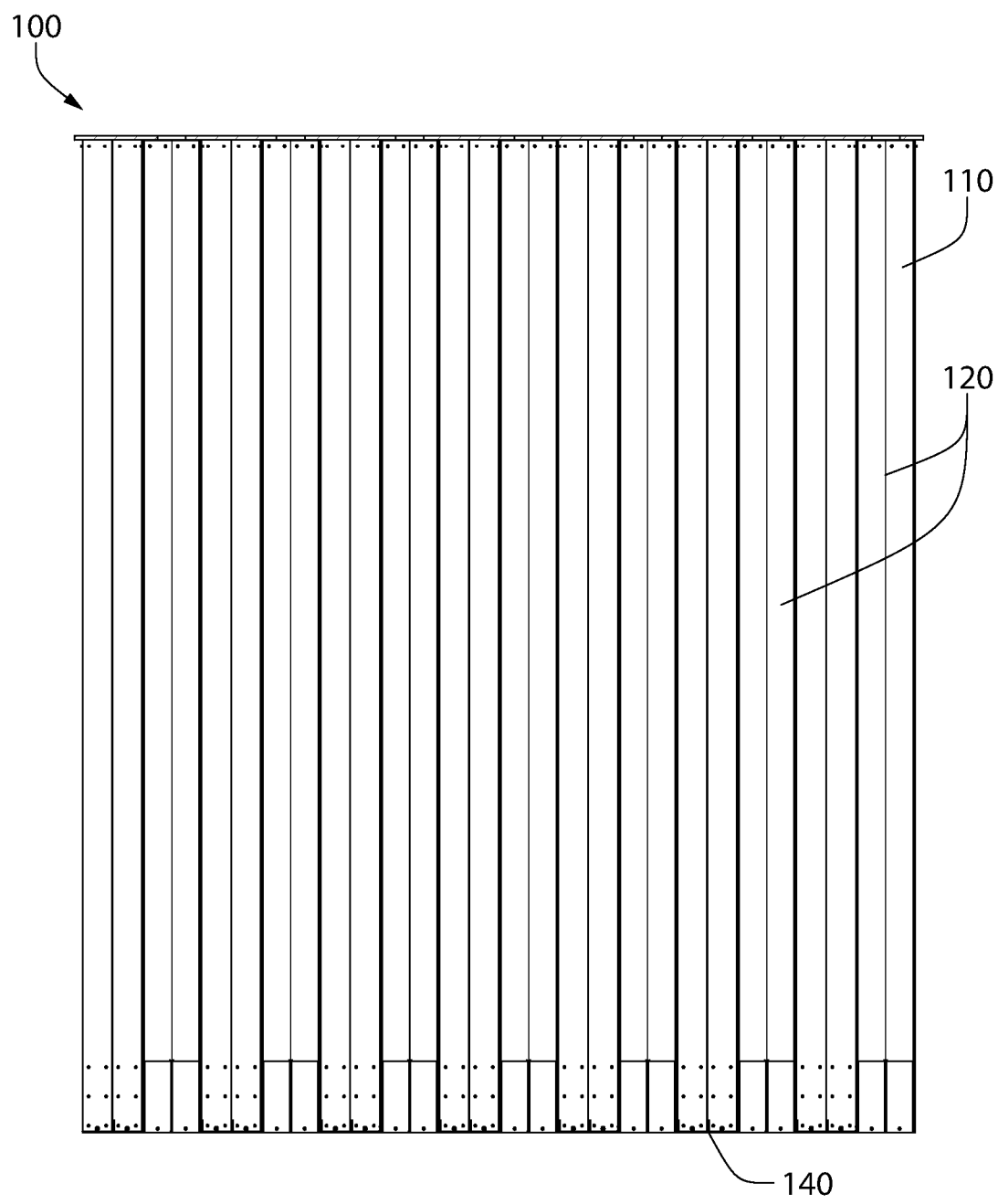
FIG. 13 is a third cross sectional view of the fuel rack.
Figure 14:
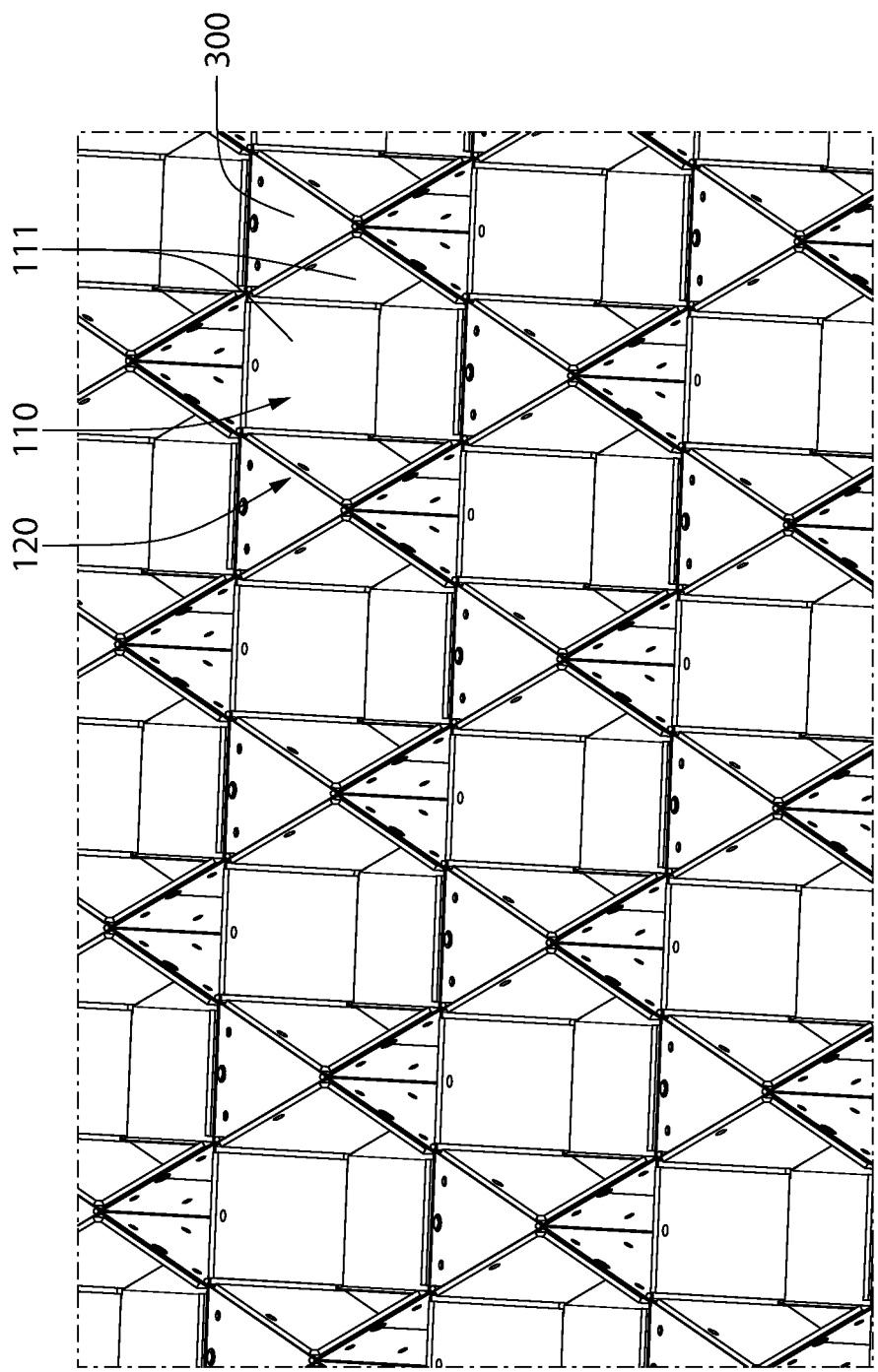
FIG. 14 is a top perspective view of a portion of the fuel rack showing the cellular body and hexagonal fuel storage cells thereof.

As shown in FIGS. 4-5 and 15, all adjacent hexagonal fuel storage cells 110 and tubes 120 in fuel rack 100 have a staggered arrangement and meet in a corner-to-corner alignment in which the corner 112 of one cell/tube is directly aligned with the corner 112 of any adjacent tube. Accordingly, for each pair of adjacent cells, a single corner of one cell 110 interfaces with only a single corner of the adjacent cell forming an open recess in the form of a triangular flux trap 300 (further described herein) disposed on both sides of the corner-to-corner intersection of the cells (see, e.g., FIG. 5). Viewed an additional way, each flat cell wall 111 has a corresponding adjacent triangular flux trap 300 which minimizes radiation transmission to other adjacent cells in the fuel rack through the walls. This new cells orientation and arrangement is distinct from past hexagonal cells arrangements such as shown for example in commonly-owned U.S. Pat. No. 8,576,976, which is incorporated herein by reference. In this patent, the flat outer faces of each cell wall in the tube array meet corresponding faces of adjacent cells/ tubes in a face-to-face abutment and alignment between tube walls (see, e.g., FIGS. 7-9 in patent). Such an arrangement of hexagonal tubes does not allow for the formation of water-filled flux traps 300 when the fuel rack is immersed in the fuel pool 40 between adjacent tubes for radiation control, or the formation of V-shaped sawtooth peripheral sides of the fuel rack baseplate disclosed herein. Somewhat similarly in commonly-owned U.S. Pat. No. 10,037,826, which is incorporated herein by reference, at least tubes in each row on the fuel rack meet face-to-face (see, e.g., FIGS. 3A and 3D in patent). This is not a staggered array of cells and does not lend itself to tightly packed fuel assembly storage in the fuel rack. Moreover, each flat cells wall does not have an adjacent triangular flux trap to minimize radiation transmission between cells.

As best shown in present FIG. 4, tubes 120 and cells 110 defined thereby of fuel rack 100 are geometrically arranged atop the baseplate 140 in series of parallel rows R1 and parallel columns C1 along the designated Z-axis and X-axis respectively. The tubes/cells are arranged in a staggered array meaning the tubes/cells in one row or column are laterally offset from the tubes/cells in adjacent rows or columns. The staggered arrangement and corner-to-corner aligned of tubes/cells allows each cell wall to have an adjacent corresponding triangular flux trap 300 for improved radiation transmission blockage between adjacent cells. Any suitable array size including equal or unequal numbers of tubes in each row and column may be provided depending on the horizontal length and width of the pool floor slab 42 and number of fuel racks 100 to be provided. In some arrangements, some or all of the fuel racks 100 in fuel pool 40 may have unequal lateral width and lateral length as to best make use of a maximum amount of available floor slab surface area in the pool as possible for each installation.

Accordingly to another aspect, the corner-to-corner relationship and alignment between adjacent cells 110/tubes 120 in fuel rack 100 create flux traps 300 therebetween of a triangular shape and configuration which are interspersed between the cells/tubes. The staggered rectangular array of cells and tubes therefore forms a plurality of triangular flux traps which separate the cells and tubes in the fuel rack. Advantageously, the triangular-shaped flux traps allows the cells 110/tubes 120 to be aligned in a staggered rectangular array as shown (versus a circular array used in some past approaches). Furthermore, the staggered rectangular array created by only corner-to-corner alignment and interface between adjacent cells/tubes also advantageously matches the operating directions of the fuel handling equipment/rigging so location of a specific cell in the spent fuel pool is less prone to mistake during the submerged fuel loading and unloading operations in the fuel pool. In addition, the triangular shaped flux traps provide the desired radiation control while occupying minimal space within the fuel rack to still achieve a high packing density of fuel assemblies 30 in the rack.

As best shown in FIGS. 4-5 and 15, at least some of the interior cells 110 of the fuel rack are separated from adjacent cells by a pair of triangular flux traps 300 (i.e. one flux trap on each side of the corners 112 of the cells/tubes). Moreover, at least each interior cell 110 (i.e. those not along the perimeter of the fuel rack) has flat cell walls 111 which have a corresponding adjacent triangular flux trap 300 which minimizes radiation transmission between adjacent cells through the walls. These are "captive" flux traps 300*a* which are circumscribed and bounded on all sides by the cell walls 111 of the adjacent cells/tubes. The outermost perimeter cells/tubes of the fuel rack 100 arranged around the four lateral sides 130 of the rack define and are separated from adjacent cells by outwardly open recesses forming laterally open flux traps 300*b* of a triangular shape as well. The perimeter cells 110/tubes 120 are separated from adjacent perimeter cells/tubes by a pair of a captive flux trap 300*a* and a laterally open flux trap 300*b* each being triangular shaped. All flux traps 300*a*, 300*b* fill with water when fuel rack 100 is immersed in fuel pool 40 to control radiation transmission and criticality.

According to another aspect of the invention, the cells 110 and fuel rack storage tubes 120 in some embodiments may further each include at least one neutron absorber apparatus 200 disposed inside the tube cell cavity 118. Each apparatus preferably extends vertically at least over the active zone or height of the fuel rack tubes 120 where the fuel in the fuel assemblies 30 are stored when positioned in the fuel rack 100.

Figure 22:
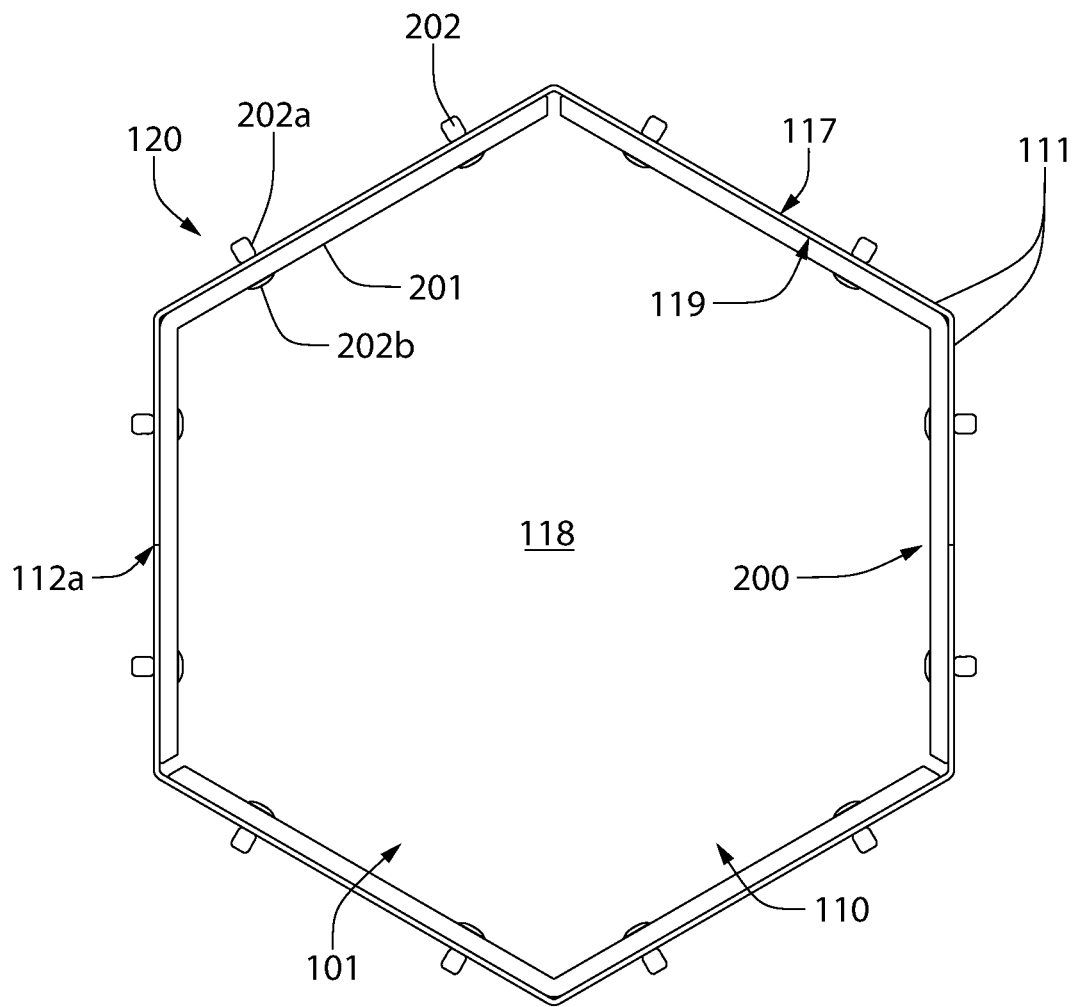
FIG. 22 is a top view of the fuel storage tube showing neutron absorber plates affixed to the cell walls of the tube inside the cell cavity.

In one embodiment, the absorber apparatuses 200 may comprise a plurality of vertically elongated boron-containing absorber plates 201 to ameliorate neutron radiation streaming. Absorber plates 201 may have a length substantially coextensive (e.g., 95% or more) with height H1 of the tubes 120/cells 110. Each plate 201 may have a rigid structure and be affixed to one or more of the cell walls 111 inside each storage tube 120 depending on the shape of the plates. In some embodiments, absorber plates 201 may have a flat shape. In other embodiments as illustrated in FIG. 22, the absorber plates may each have a chevron shape to advantageously reduce the number of plates required for each fuel storage cell 110. As shown, a single cell cavity 118 of a tube 120 may be substantially covered by using three chevron-shaped plates 201 affixed to the inner surface 119 of cells walls 111 in lieu of using six individual flat plates, thereby reducing labor to install the radiation shielding. Because the boron-containing plates are not amenable to welding to the steel storage tubes walls 111, non-welding mechanical fastening means such as clips, rivets, threaded fasteners, etc. are preferably used to secure the plates to the tubes. As a non-limiting example shown in FIGS. 5-6 and 22, rivets 202 may be used which are secured through the absorber plates 201 and cell walls 111 of each storage tube 120. The cell walls 111 of the tubes may include plural mounting holes 203 (see, e.g., FIGS. 16-17) at least in the upper and lower regions of the tubes as shown which allow the shafts 202*a* of rivets 202 to extend therethrough to complete the securement of the absorber plates 201 to the tubes. The diametrically broadened and rounded heads 202*b* of the rivets 202 preferably engage the inward facing surfaces of the absorber plates 201 (see, e.g., FIG. 22) to allow the fuel assembly 30 to be slideably inserted into the storage tubes 120 from above without obstruction from the rivets.

The absorber plates 201 may be made of a suitable rigid boron-containing metallic poison material such as without limitation borated aluminum. In some embodiments, without limitation, the absorber plates 201 may be formed of a rigid metal-matrix composite material, and preferably a discontinuously reinforced aluminum/boron carbide metal matrix composite material, and more preferably a boron impregnated aluminum. One such suitable material is sold under the tradename METAMIC™ available from Holtec International of Camden, New Jersey. Other suitable borated metallic materials suitable to form rigid plates however may be used. The rigid structure of the foregoing absorber plate radiation poison material provide resistance to abrasion and damage when the hexagonal fuel assemblies (see, e.g., FIG. 25) are slid downwards into the open cells 110 of tubes 120 by rigging (e.g., hoists/cranes) positioned above the fuel pool. Fuel racks are typically loaded with fuel assemblies while submerged beneath the surface of the pool water W. The boron carbide aluminum matrix composite material of which the absorber plates 201 are constructed includes a sufficient amount of boron carbide so that the absorber sheets can effectively absorb neutron radiation emitted from a spent fuel assembly, and thereby shield adjacent spent fuel assemblies in a fuel rack from one another. The absorber plates may be constructed of an aluminum boron carbide metal matrix composite material that is about 20% to about 40% by volume boron carbide. Of course, other percentages may also be used. The exact percentage of neutron absorbing particulate reinforcement which is in the metal matrix composite material, in order to make an effective neutron absorber for an intended application, will depend on a number of factors, including the thickness (i.e., gauge) of the absorber plates 201, the spacing between adjacent cells within the fuel rack, and the radiation levels of the spent fuel assemblies.

EXAMPLE CLAIMS

Following are example claims for the foregoing described invention and aspects thereof.

Example Claim 1: A fuel rack for storing spent nuclear fuel comprising: a baseplate; and a cellular body coupled to the baseplate and comprising a plurality of open cells, each cell having a hexagonal configuration to receive a fuel assembly therein, each cell being formed by a plurality of angled cell walls and corners formed between adjoining cell walls; wherein all adjacent cells meet in a corner-to-corner alignment.

Example Claim 2: The fuel rack according to claim 1, wherein each cell is vertically elongated and configured to hold a single fuel assembly.

Example Claim 3: The fuel rack according to claim 2, wherein each corner of each cell is formed by an oblique intersection of a pair of the cell walls.

Example Claim 4: The fuel rack according to any one of claims 1-3, wherein each cell interfaces with each adjacent cell at a single corner each therebetween.

Example Claim 5: The fuel rack according to claim 4, wherein each cell wall defines an outer face between a pair of corners, and adjacent cells of the fuel rack do not meet in a face-to-face alignment.

Example Claim 6: The fuel rack according to any one of claims 1-3, further comprising at least one neutron absorbing apparatus inserted inside each cell.

Example Claim 7: The fuel rack according to claim 5, wherein the at least one neutron absorber apparatus comprising a plurality of boron-containing plates, each plate being affixed to one of the cell walls.

Example Claim 8: The fuel rack according to claim 7, wherein the boron-containing plates each have a length substantially coextensive with a height of the cell walls.

Example Claim 9: The fuel rack according to claim 1, wherein the cells are formed by a plurality of individual hexagonal tubes fixedly coupled to the baseplate.

Example Claim 10: The fuel rack according to claim 9, wherein perimeter tubes arranged around lateral sides of the fuel rack define outwardly open triangular recesses forming flux traps.

Example Claim 11: The fuel rack according to any one of claims 1-10, wherein the fuel rack further comprises a plurality of triangular flux traps interspersed between and separating the cells in the fuel rack.

Example Claim 12: The fuel rack according to claim 11, wherein at least some of the interior cells of the fuel rack are separated from adjacent cells by a pair of triangular flux traps.

Example Claim 13: The fuel rack according to claim 1, wherein the cells are arranged in a plurality of laterally extending linear rows on the baseplate, and the cells in one row are laterally offset from the cells in adjacent rows.

Example Claim 14: The fuel rack according to claim 1, wherein a first peripheral side of the baseplate comprises an undulating configuration defining a series of alternating peaks and valleys.

Example Claim 15: The fuel rack according to claim 14, wherein the first peripheral side has sawtooth configuration, the peaks and valleys being V-shaped.

Example Claim 16: The fuel rack according to claim 14 or 15, wherein the valleys of the first peripheral side are configured to receive peaks of a mating second baseplate having a peripheral side with an undulating configuration.

Example Claim 17: The fuel rack according to claim 14 or 15, wherein a second peripheral side of the baseplate opposite the first peripheral side also comprises an undulating configuration defining a series of alternating peaks and valleys.

Example Claim 18: The fuel rack according to claim 1, wherein the cells are formed by a plurality of interlocking and intersecting slotted plates.

Example Claim 19: The fuel rack according to claim 18, wherein the slotted plates comprise a first and second set of slotted plates each oriented obliquely to peripheral sides of the baseplate, and a third set of slotted plates arranged perpendicularly to two opposing peripheral sides of the baseplate.

Example Claim 20: The fuel rack according to claim 18 or 19, wherein the first, second, and third sets of slotted plates do not intersect each other orthogonally.

Example Claim 21: A nuclear fuel storage system comprising: a first baseplate configured for placement in a spent fuel pool, the first baseplate comprising a peripheral side having a non-linear profile configured to mate with a complementary configured non-linear profile of a peripheral side of a second baseplate of a second fuel rack; and a cellular body coupled to the first baseplate and comprising a plurality of open cells, each cell having a configuration for receiving a fuel assembly therein; wherein the non-linear profile of the peripheral side of the second baseplate is at least partially nestable within the non-linear profile of the peripheral side of the first baseplate.

Example Claim 22: The fuel rack according to claim 21, wherein each non-linear profile has an undulating shape defining a series of alternating peaks and valleys.

Example Claim 23: The fuel rack according to claim 22, wherein the undulating shape has a sawtooth configuration, the peaks and valleys being V-shaped.

Example Claim 24: The fuel rack according to claim 22 or 23, wherein the valleys of the first baseplate are configured to receive the peaks of the mating second baseplate.

Example Claim 25: The fuel rack according to claim 22, wherein an additional peripheral side of the first baseplate opposite the peripheral side with a non-linear profile of the first baseplate also comprises a non-linear profile.

Example Claim 26: A method for storing nuclear fuel in a fuel pool in a tightly packed configuration comprising: positioning a first fuel rack on a floor of a fuel pool, the first fuel rack comprising a plurality of open cells each configured for receiving a fuel assembly therein and a first baseplate defining a first undulating peripheral side; positioning a second fuel rack on a floor of a fuel pool, the second fuel rack comprising a plurality of open cells each configured for receiving a fuel assembly therein and a second baseplate defining a second undulating peripheral side; nesting the second undulating peripheral side of the second baseplate at least partially within the first undulating peripheral side of the first baseplate.

Example Claim 27: The method according to claim 26, wherein the first and second undulating peripheral sides each have a sawtooth configuration defining a plurality of peaks and valleys, and wherein the valleys of the first baseplate receive the peaks of the second baseplate during the nesting step.

Example Claim 28: The method according to claim 26 or 27, wherein the cells of the first and second fuel racks have a hexagonal shape.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A fuel rack for storing spent nuclear fuel comprising:
   a baseplate; and
   a cellular body coupled to the baseplate and comprising a plurality of open cells, each cell having a hexagonal configuration to receive a fuel assembly therein, each cell being formed by a plurality of angled cell walls and corners formed between adjoining cell walls;
   wherein the cells are arranged so that the corners of each cell directly abuttingly engage only the corners of any adjacent cell of the cellular body so as to define a triangular flux trap on each side of the directly abuttingly engaged corners.

2. The fuel rack according to claim 1, wherein each cell is vertically elongated and configured to hold a single fuel assembly.

3. The fuel rack according to claim 2, wherein each corner of each cell is formed by an oblique intersection of a pair of the cell walls.

4. The fuel rack according to claim 1, wherein each cell wall defines a flat outer face between a pair of corners, and cell walls of the fuel rack do not meet in a face-to-face alignment.

5. The fuel rack according to claim 1, further comprising at least one neutron absorbing apparatus inserted inside each cell.

6. The fuel rack according to claim 5, wherein the at least one neutron absorber apparatus comprising a plurality of boron-containing plates, each plate being affixed to one of the cell walls.

7. The fuel rack according to claim 6, wherein the boron-containing plates each have a length substantially coextensive with a height of the cell walls.

8. The fuel rack according to claim 1, wherein the cells are formed by a plurality of individual hexagonal tubes fixedly coupled to the baseplate.

9. The fuel rack according to claim 8, wherein perimeter tubes arranged around lateral sides of the fuel rack define outwardly open triangular recesses forming flux traps.

10. The fuel rack according to claim 1, wherein the triangular flux traps on each side of the directly abuttingly engaged corners defines a plurality of triangular flux traps interspersed between and separating the cells in the fuel rack.

11. The fuel rack according to claim 10, wherein at least some of the interior cells of the fuel rack are separated from adjacent cells by a pair of triangular flux traps.

12. The fuel rack according to claim 1, wherein the cells are arranged in a plurality of laterally extending linear rows on the baseplate, and the cells in one row are laterally offset from the cells in adjacent rows.

13. The fuel rack according to claim 1, wherein a first peripheral side of the baseplate comprises an undulating configuration defining a series of alternating peaks and valleys.

14. The fuel rack according to claim 13, wherein the first peripheral side has sawtooth configuration, the peaks and valleys being V-shaped.

15. The fuel rack according to claim 13, wherein the valleys of the first peripheral side are configured to receive peaks of a mating second baseplate having a peripheral side with an undulating configuration.

16. The fuel rack according to claim 13, wherein a second peripheral side of the baseplate opposite the first peripheral side also comprises an undulating configuration defining a series of alternating peaks and valleys.

17. The fuel rack according to claim 1, wherein the cells are formed by a plurality of interlocking and intersecting slotted plates.

18. The fuel rack according to claim 17, wherein the slotted plates comprise a first and second set of slotted plates each oriented obliquely to peripheral sides of the baseplate, and a third set of slotted plates arranged perpendicularly to two opposing peripheral sides of the baseplate.

19. The fuel rack according to claim 18, wherein the first, second, and third sets of slotted plates do not intersect each other orthogonally.

20. A fuel rack for storing spent nuclear fuel comprising:
    a baseplate;
    a cellular body formed by a plurality of vertically elongated hexagonal tubes extending upwards from the baseplate;
    the tubes defining an array of hexagonal-shaped open cells each configured to receive a fuel assembly therein, each of the tubes comprising a plurality of obliquely angled cell walls in which contiguous adjoining cell walls meet at corners, each tube comprising a plurality of corners;
    the corners of each tube directly abuttingly contacting corners of adjacent tubes in the array such that a pair of triangular spaces defining flux traps are formed by the cell walls between the adjacent tubes at the directly abuttingly contacting corners.

21. The fuel rack according to claim 20, wherein a first one of the pair of triangular spaces is formed on a first side of the corners in abutting contact between the adjacent tubes, and a second one of the pair of triangular spaces is formed on a second side of the corners in abutting contact between the adjacent tubes.

22. The fuel rack according to claim 20, wherein the array of open cells is a staggered array in which the tubes are arranged in a series of rows and columns on the baseplate, the tubes in each row being laterally offset from the tubes in adjacent rows, and the tubes in each column being laterally offset from the tubes in adjacent columns.

\* \* \* \* \*